(12) United States Patent
Meredith et al.

(10) Patent No.: US 8,156,472 B2
(45) Date of Patent: Apr. 10, 2012

(54) PROCESS LANGUAGE FOR MICROPROCESSORS WITH FINITE RESOURCES

(75) Inventors: L. Gregory Meredith, Seattle, WA (US); Allen L. Brown, Jr., Bellevue, WA (US); David Richter, Seattle, WA (US); George Moore, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 2231 days.

(21) Appl. No.: 10/816,558

(22) Filed: Mar. 30, 2004

(65) Prior Publication Data

US 2005/0183099 A1 Aug. 18, 2005

Related U.S. Application Data

(60) Provisional application No. 60/544,114, filed on Feb. 12, 2004.

(51) Int. Cl.
*G06F 9/44* (2006.01)
*G06F 9/45* (2006.01)
*G06F 13/10* (2006.01)

(52) U.S. Cl. ........ 717/114; 717/116; 717/136; 717/143; 703/21

(58) Field of Classification Search .................. None
See application file for complete search history.

(56) References Cited

U.S. PATENT DOCUMENTS

| | | | | |
|---|---|---|---|---|
| 6,625,719 B2* | 9/2003 | Leach et al. | .................. | 711/220 |
| 7,055,142 B2* | 5/2006 | Meredith et al. | .............. | 717/136 |
| 7,117,487 B2* | 10/2006 | Meredith et al. | .............. | 717/143 |
| 7,216,335 B2* | 5/2007 | Meredith et al. | .............. | 717/114 |
| 7,685,566 B2* | 3/2010 | Brown et al. | ................. | 717/114 |
| 7,694,276 B2* | 4/2010 | Larus et al. | .................... | 717/116 |
| 2003/0212671 A1* | 11/2003 | Meredith et al. | ................. | 707/3 |
| 2005/0166183 A1* | 7/2005 | Brown et al. | ................. | 717/114 |
| 2005/0182614 A1* | 8/2005 | Meredith | ....................... | 703/21 |

FOREIGN PATENT DOCUMENTS

WO    WO03096209    5/2003

OTHER PUBLICATIONS

Carbone et al., "On the Expressive Power of Polyadic Synchronization in π-calculus", 2002 Elsevier Science B. V., pp. 1-18.*
Cuesta et al., "Coordination in a Reflective Architecture Description Language", 2002 Springer-Verlag Berlin Heidelberg, pp. 141-148.*

(Continued)

*Primary Examiner* — Thuy Dao
*Assistant Examiner* — Ben Wang
(74) *Attorney, Agent, or Firm* — Lee & Hayes, PLLC

(57) ABSTRACT

A reflective process algebra called the ρ-calculus facilitates the serialization of processes at the level of the reflective process algebra. The reflective process algebra because of its reflective properties, can be used on computing systems with finite resources. The reflective process calculus can be made to be sensitive to resources, such as memory and bandwidth, hence facilitating its use as a programming language at the machine level. The reflective process calculus causes the dual nature of a computation entity to be exposed. A name can be caused to become a process and a process can be caused to become a name.

14 Claims, 24 Drawing Sheets

OTHER PUBLICATIONS

Cuesta et al., "Reflection-Based Aspect-Oriented Software Architecture", EWSA 2004, LNCS 3047, pp. 43-56 <http://www.google.com/#sclient=psy-ab&hl=en&source=hp&q=reflective+process+algebra>.*

Pym et al., "Systems Modeling via Resources and Processes: Philosophy, Calculus, Semantics, and Logic", 2007 Elsevier B.V., pp. 544-587 <http://dl.acm.org/results.cfm?h=1&cfid=55871732&cftoken=44809703>.*

Marco et al., "Optimisation of Process Algebra Models Using Evolutionary Computation", 2011 IEEE, pp. 1296-1301 <http://ieeexplore.ieee.org/search/searchresult.jsp?newsearch=true&queryText=process+algebra>.*

Translated the Japanese Office Action mailed on Feb. 4, 2011 for Japanese Patent Application No. 2005-33507, a counterpart foreign application for U.S. Appl. No. 10/816,558.

The Korean Office Action mailed May 25, 2011 for Korean Patent Application No. 10-2005-11644, a counterpart foreign application of U.S. Appl. No. 10/816,558.

Bodei, et al., "Names of the [pi]-calculus agents handled locally*", Theoretical Computer Science, vol. 253, No. 2, Jan. 1, 2000, p. 155-184.

The European Search Report mailed Jul. 25, 2011 for European patent application No. 05100993.4.

Translated the Japanese Office Action mailed Jul. 22, 2011 for Japanese patent application No. 2005-33507, a counterpart foreign application of U.S. Appl. No. 10/816,558.

Meredith, et al., "Contract and Types", Communications of the ACM, vol. 46, No. 10, Oct. 1, 2003, p. 41-47.

* cited by examiner

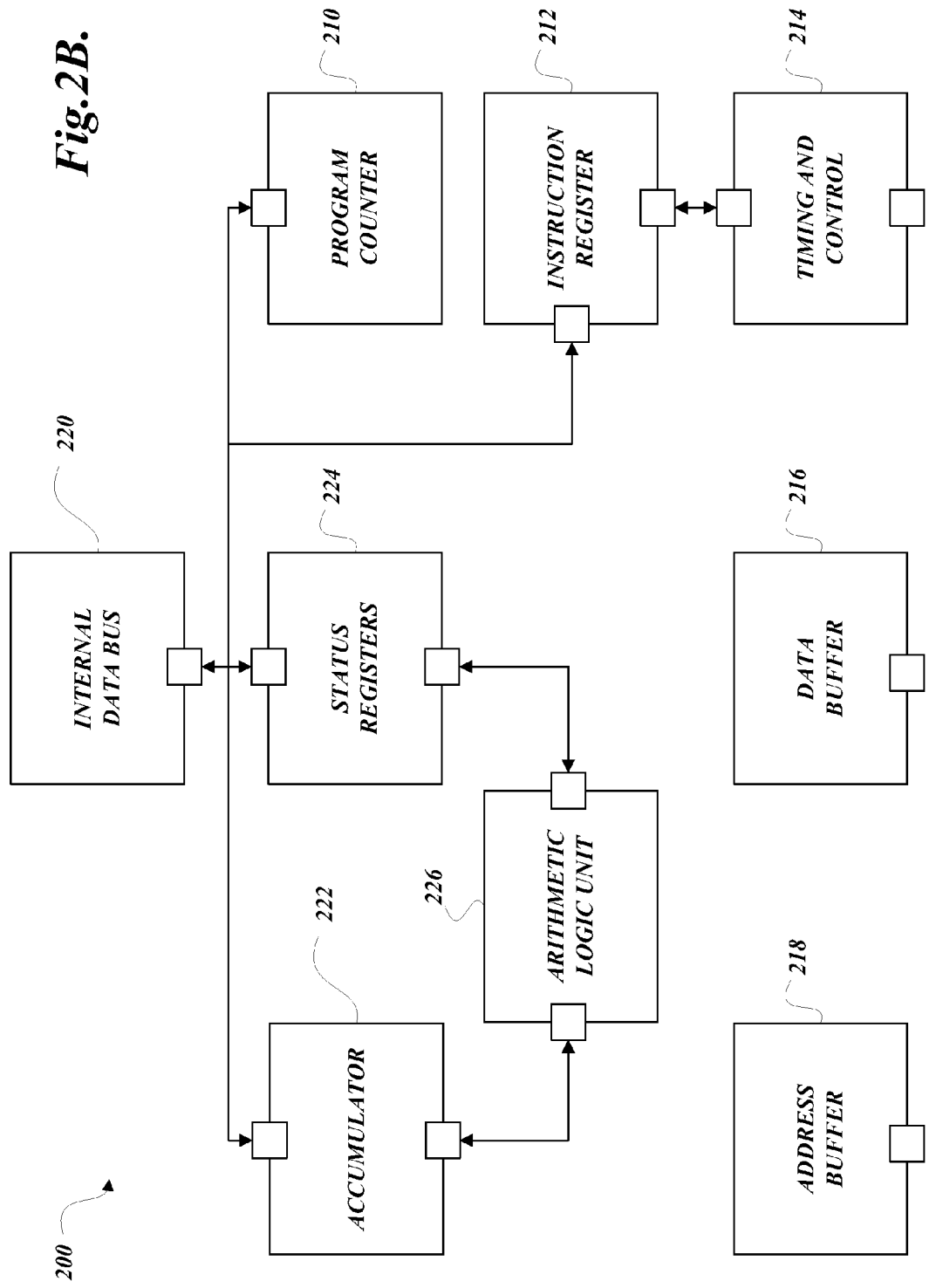

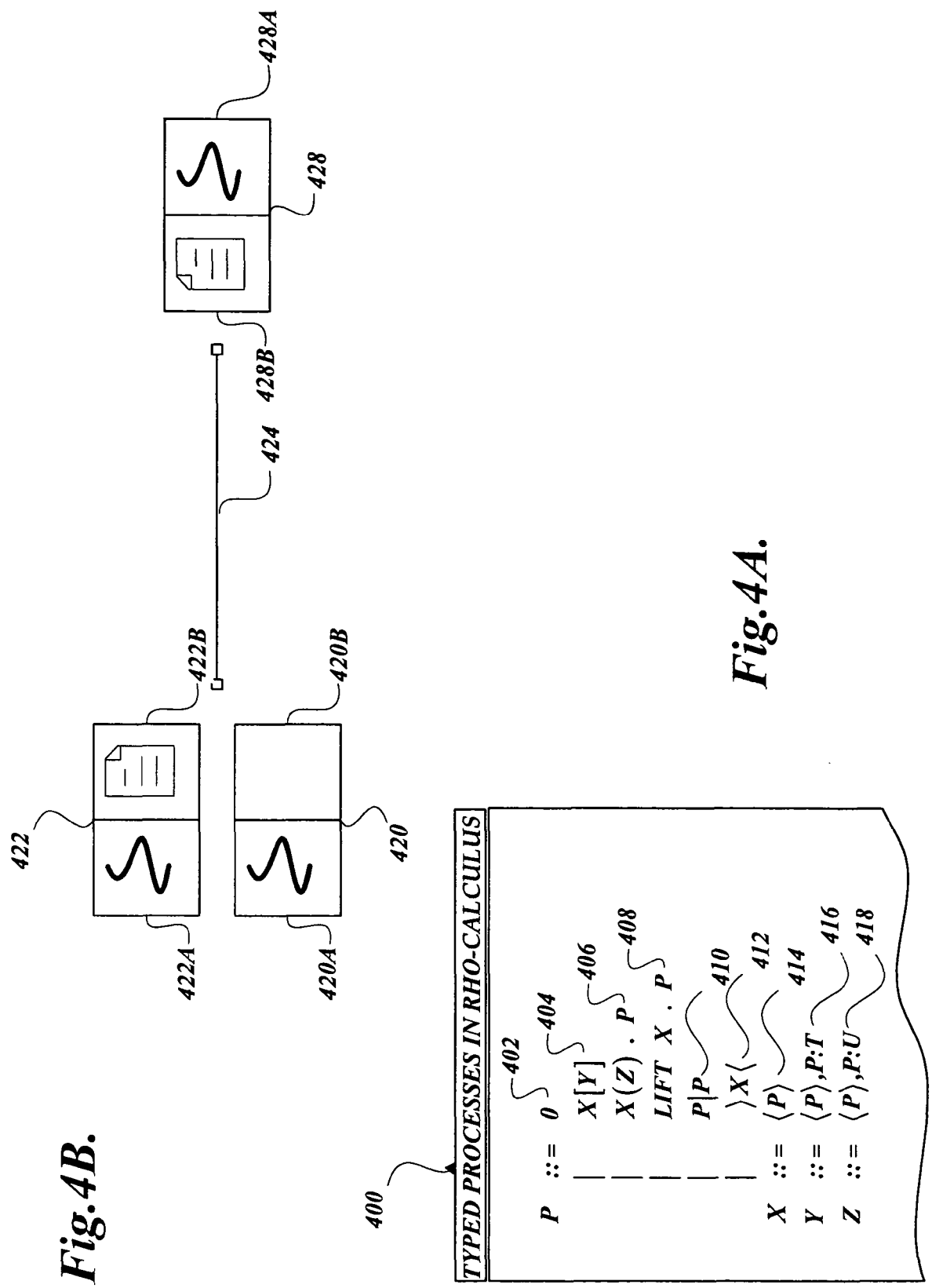

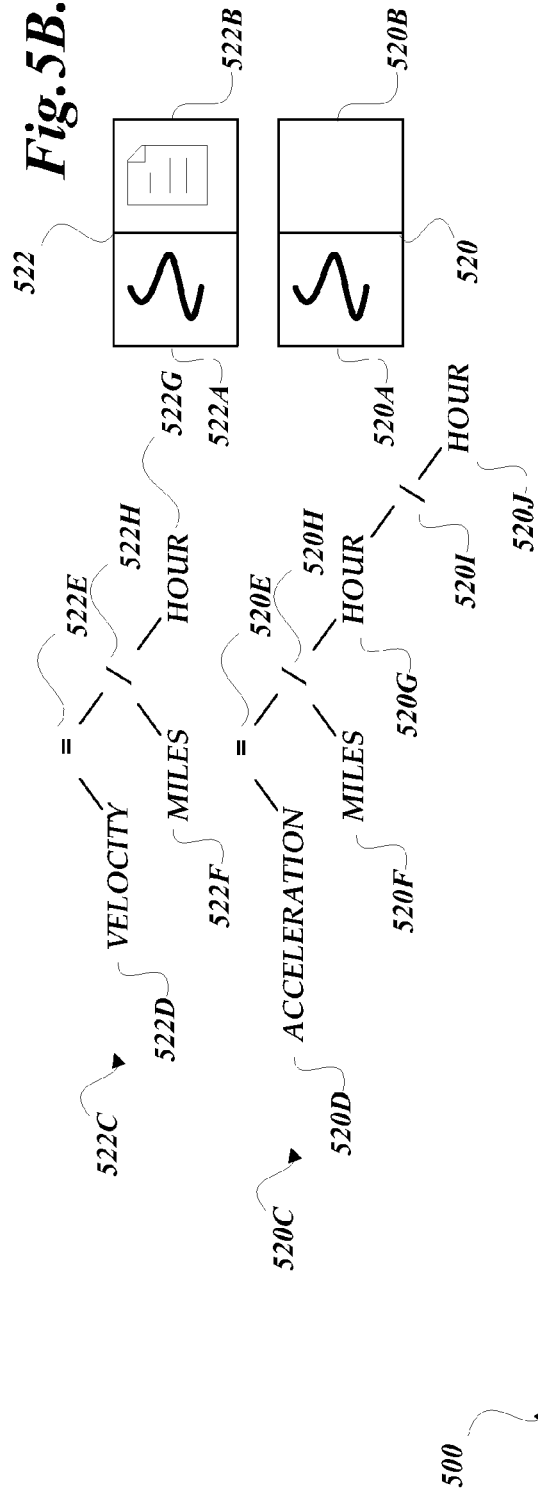
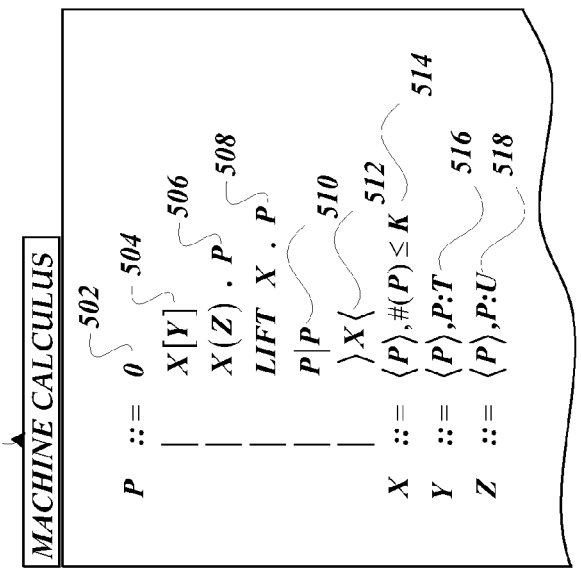
*Fig.5B.*
*Fig.5A.*

*Fig.6A.*

REPLICATION $!P \triangleq \text{LIFT } X . (X(Y) . ( )Y\langle|X[Y]\rangle |P) | X(Z) . ( )Z\langle|X[Z]\rangle)$ ~ 602

*Fig.6B.*

LIFT $X . (X(Y) . ( )Y\langle|X[Y]\rangle |P)$
604 ~
$X [ \langle P1 \rangle ]$ $(X(Y) . ( )Y\langle|X[Y]\rangle |P)$
606 ~ P1

$X(Z)$

608 ~
$\langle(X(Y) . ( )Y\langle|X[Y]\rangle |P)\rangle$

610 $\rangle Z\langle$
~ $(X(Y) . ( )Y\langle|X[Y]\rangle |P)$ $X[Z]$
612 ~
$X [ \langle P1 \rangle ]$

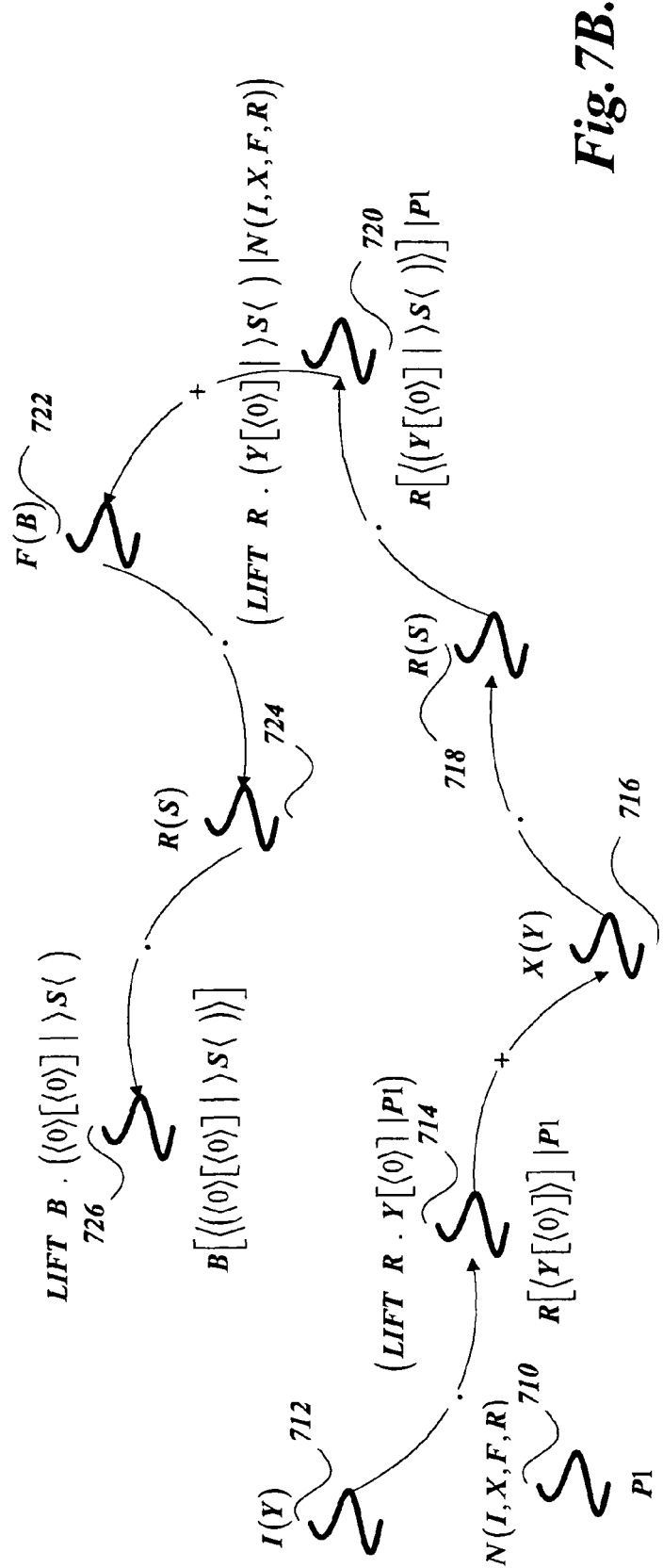

PROCESS LANGUAGE FOR MICROPROCESSORS WITH FINITE RESOURCES

CROSS-REFERENCE TO RELATED APPLICATION

This application claims the benefit of U.S. Provisional Application No. 60/544,114, filed Feb. 12, 2004, which is expressly incorporated herein by reference.

FIELD OF THE INVENTION

The present invention relates generally to programming languages, and more particularly, to artificial languages for expressing processes and their interactions that can ultimately be executed by a microprocessor with finite resources.

BACKGROUND OF THE INVENTION

Microprocessors, such as a CISC-based microprocessor 102, are at the heart of all personal computers. See FIG. 1. When power 104 and memory 106 are added to the CISC-based microprocessor 102, all the pieces required for forming a computer are present. The CISC-based microprocessor 102 accomplishes tasks by obeying instructions that are given to it. Instructions are expressions written in an artificial language, such as a programming language. Early microprocessors used only simple instructions because the cost of microelectronic hardware capable of carrying out complex instructions was very high. As these costs decreased over time, more complicated instructions became possible. Complex instructions (single instructions that specify multiple microprocessor operations) can save time because they make it unnecessary for the computer to retrieve additional instructions. For example, if seven operations are combined into one instruction, then six of the steps that fetch instructions are eliminated and the microprocessor spends less time processing that operation. Microprocessors that combine several instructions into a single operation are called complex instruction set computers (CISC).

The CISC-based microprocessor 102 uses registers to store results of executed instructions. Each register is a set of bits of high-speed memory within the CISC-based microprocessor 102 used to hold data for a particular purpose. Each register is referred to in assembly language programs by a name such as AX (the register that contains the results of arithmetic operations in a computer processor such as an INTEL® 80×86 processor) or SP (the register that contains the memory address at the top of the stack in various CISC-based microprocessors). Each register, in essence, is shared memory between components of the CISC-based microprocessor 102. Using registers as shared memory, one component performs a specific operation and stores the result of the specific operation in a register. In a sequential fashion, another component may then access the same register to obtain the result in the performance of other operations.

Such a sequential execution of operations allows the components of the CISC-based microprocessor 102 to appear as if they were synchronous in their communication. Nearly all instructions in programs, such as in a CISC-based middleware 108, are designed to execute sequentially. Hardware interrupts available with the CISC-based microprocessor 102 can be used as a way to add asynchrony and thereby concurrent execution of operations. A hardware interrupt is a request for service from the CISC-based microprocessor 102, generated either externally by a hardware device, such as a disk drive or an input/output port, or internally by the CISC-based microprocessor 102 itself. External hardware interrupts are used for such situations as a character received from a port and needing to be processed, a disk write ready to transfer a block of data, or a tick of the system timer. Internal hardware interrupts occur when a program attempts an impossible action, such as accessing an unavailable address or dividing by zero. Due to the divergent architecture (synchronous nature of the microprocessor components and the asynchronous nature of hardware interrupts), just one programming error in an interrupt handler may deadlock the CISC-based microprocessor 102 or corrupt data in a pathologic, rarely reproducible manner.

π-calculus programs 110 can bring desired asynchrony and parallelism to the synchronous and sequential execution design of CISC-based middleware 108 and the CISC-based microprocessor 102. π-calculus is a mathematical language for describing processes in interactive, concurrent systems. The core of π-calculus consists of a system of independent, parallel processes that communicate via links. The possibilities of communication for a process with other processes depends on its knowledge of various different links. Links may be restricted so that only certain processes can communicate on them.

Although π-calculus can bring much needed asynchrony and parallelism to computing, there are significant shortcomings. π-calculus places great emphasis on pure names, each of which is defined to be only a bit pattern, and not structured information. π-calculus and its variants lack a tolerance for the passage of structured data on named links. To create a new name, such as the name X, a ν operator is used in π-calculus. For example, the mathematical term (νX) P denotes the creation of the name X, and its scope is restricted to the process P. Components of the process P can use X to interact with one another, but not with other processes. Consider the mathematical structurally congruent rule (νX)(νX)P≡(νX)P. The term (νX) is defined as an operation requiring memory allocation using functions such as malloc( ). Suppose there is only sufficient memory remaining in a computing system for one invocation of the term (νX). If such is the case, the term (νX) on the right-hand side of the structurally congruent rule processes without failure. Not so with the term (νX) (νX) P on the left-hand side of the structurally congruent rule because the second invocation of (νX) will cause a memory fault.

Another problem with π-calculus is the mathematical notion of replication !P. π-calculus provides as a primitive of a language the replication !P. The term !P can be interpreted to mean an infinite composition of processes P running in parallel with one another. While !P may be theoretically transcendental, it causes problems in practical concretization. Microprocessors are creatures of finite resources, such as memory and bandwidth. While π-calculus programs do add desired asynchrony, they do not recognize that microprocessors on which these π-calculus programs execute are resource bound.

In sum, CISC-based microprocessors may not work well for asynchronous systems that require concurrent and parallel computation, namely large-scale computer systems, such as the Internet, that are decentralized. The traditional sequential execution architecture may not be suited to the need for concurrent execution of operations. While π-calculus provides some remedies in bringing asynchrony and parallelism, some of its mathematical primitives are incompatible with computing devices that have finite resources. Without solutions to the problems discussed above, users may eventually no longer trust a computing system to provide a desired computing experience, and demand for computer systems will diminish over time in the marketplace. Thus, there is a need for better integrated circuits and programming languages for facilitating better asynchrony, concurrency, and parallelism while avoiding or reducing the foregoing and other problems associated with existing CISC-based microprocessors and π-calculus.

SUMMARY OF THE INVENTION

In accordance with this invention, a system, method, and computer-readable medium for processing services written in a reflective process algebra is provided. The system form of the invention includes a computer for processing information to produce desired results. The computer comprises a computer-readable medium for storing services. The services include expressions that represent names by literalizing processes and processes by deliteralizing names. The computer further comprises a microprocessor for executing services as processes. The processes interacts via names and evolving by performing actions or causing other processes to evolve.

In accordance with further aspects of this invention, another system form of the invention includes a microprocessor for executing instructions. The microprocessor comprises a timing and control unit for retrieving an instruction from memory, decoding the instruction, fetching data connected with the instruction, and saving the result. The data includes names obtained by literalizing processes in the reflective process algebra. The microprocessor further includes an arithmetic and logic unit for performing an operation specified by the instruction. The instruction is expressed in a reflective process algebra. The reflective process algebra is capable of representing names as literalization of processes and processes as deliteralization of names.

In accordance with further aspects of this invention, a computer-readable medium form of the invention includes a computer-readable medium having computer-executable instructions stored thereon for performing a method of allowing processes to act or interact via shared names so as to evolve or cause other processes to evolve. The computer-readable medium includes computer-executable instructions expressed in a reflective process algebra. The computer-executable instructions include process syntactical elements that represent processes. The process syntactical elements are selected from a group consisting of an inactive process 0, an output process X[Y], an input process X(Z).P, a lifting process LIFT X.P, a composition of processes P|P, and a deliteralization of a name >X<.

In accordance with further aspects of this invention, a method form of the invention includes a computer-executable method for processing services. The computer-executable method includes acts of representing services as processes in a reflective process algebra. The reflective process algebra is capable of expressing processes as deliteralization of names and names as literalization of processes. Other acts of the computer-executable method includes causing processes to act or to communicate when names are shared among processes so as to facilitate the evolution of processes.

In accordance with further aspects of this invention, a system form of the invention includes an array of microprocessors for executing instructions. The array of microprocessors comprises at least one microprocessor that includes a timing and control unit for retrieving an instruction from memory, decoding the instruction, fetching data connected with the instruction, and saving the result. The data includes names obtained by literalizing processes in the reflective process algebra. The microprocessors further includes an arithmetic and logic unit for performing an operation specified by the instruction. The instruction is expressed in a reflective process algebra. The reflective process algebra is capable of representing names as literalization of processes and processes as deliteralization of names.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2B is a block diagram illustrating an internal architecture of a ρ-based microprocessor, according to one embodiment of the present invention;

FIG. 4A is a textual diagram illustrating a portion of ρ-calculus, which is a process programming language in which processes are typed, in accordance with one embodiment of the present invention;

FIG. 4B is a pictorial diagram illustrating the constraints on the reflective properties of ρ-calculus using types, in accordance with one embodiment of the present invention;

FIG. 5A is a textual diagram illustrating a portion of a machine calculus based on ρ-calculus, in accordance with one embodiment of the present invention;

FIG. 5B is a pictorial diagram illustrating constraints on the reflective properties of ρ-calculus using syntax trees, in accordance with one embodiment of the present invention;

FIG. 6A is a textual diagram illustrating a ρ-calculus program for implementing a replication service, in accordance with one embodiment of the present invention;

FIG. 6B is a pictorial diagram dynamically illustrating the replication service statically illustrated at FIG. 6A, in accordance with one embodiment of the present invention;

FIG. 7A is a textual diagram illustrating a ρ-calculus service for implementing the creation of new names, in accordance with one embodiment of the present invention;

FIG. 7B is a pictorial diagram dynamically illustrating the name service statically illustrated at FIG. 7A, in accordance with one embodiment of the present invention.

DETAILED DESCRIPTION OF THE PREFERRED EMBODIMENT

Various embodiments of the present invention provide a reflective process algebra called the ρ-calculus that facilitates the serialization of processes at the level of the reflective process algebra. The reflective process algebra because of its reflective properties, can be used on computing systems with finite resources. Prior process calculi, such as the π-calculus, lack the expressive power to govern the unbounded composition of processes and creation of names that may cause system failure. The reflective process calculus can be made to be sensitive to resources, such as memory and bandwidth, hence facilitating its use as a programming language at the machine level. The reflective process calculus causes the dual nature of a computation entity to be exposed. A name can be caused to become a process and a process can be caused to become a name. Thus, the reflective process calculus expresses the correspondence of the dynamic nature and the static nature of a computation entity. When the computation entity is static (e.g. via serialization or compilation), its program can be modified by other programs or stored away, and when it becomes dynamic again, it can participate in interactions with other processes by evolving or causing other processes to evolve.

Figure 1:
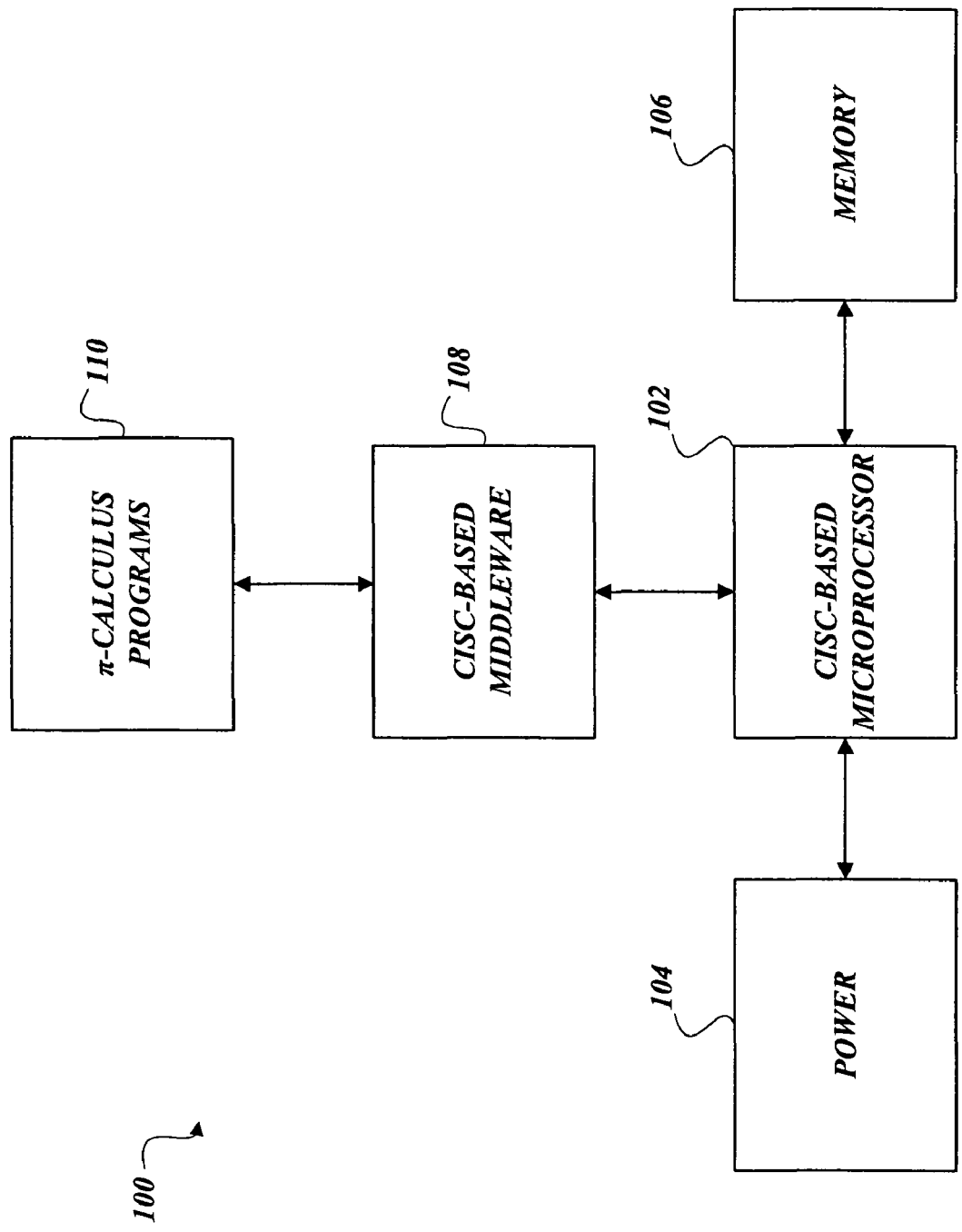
FIG. 1 is a block diagram illustrating a computing system in which π-calculus programs interface with CISC-based middleware for execution on a CISC-based microprocessor.
Figure 2A:
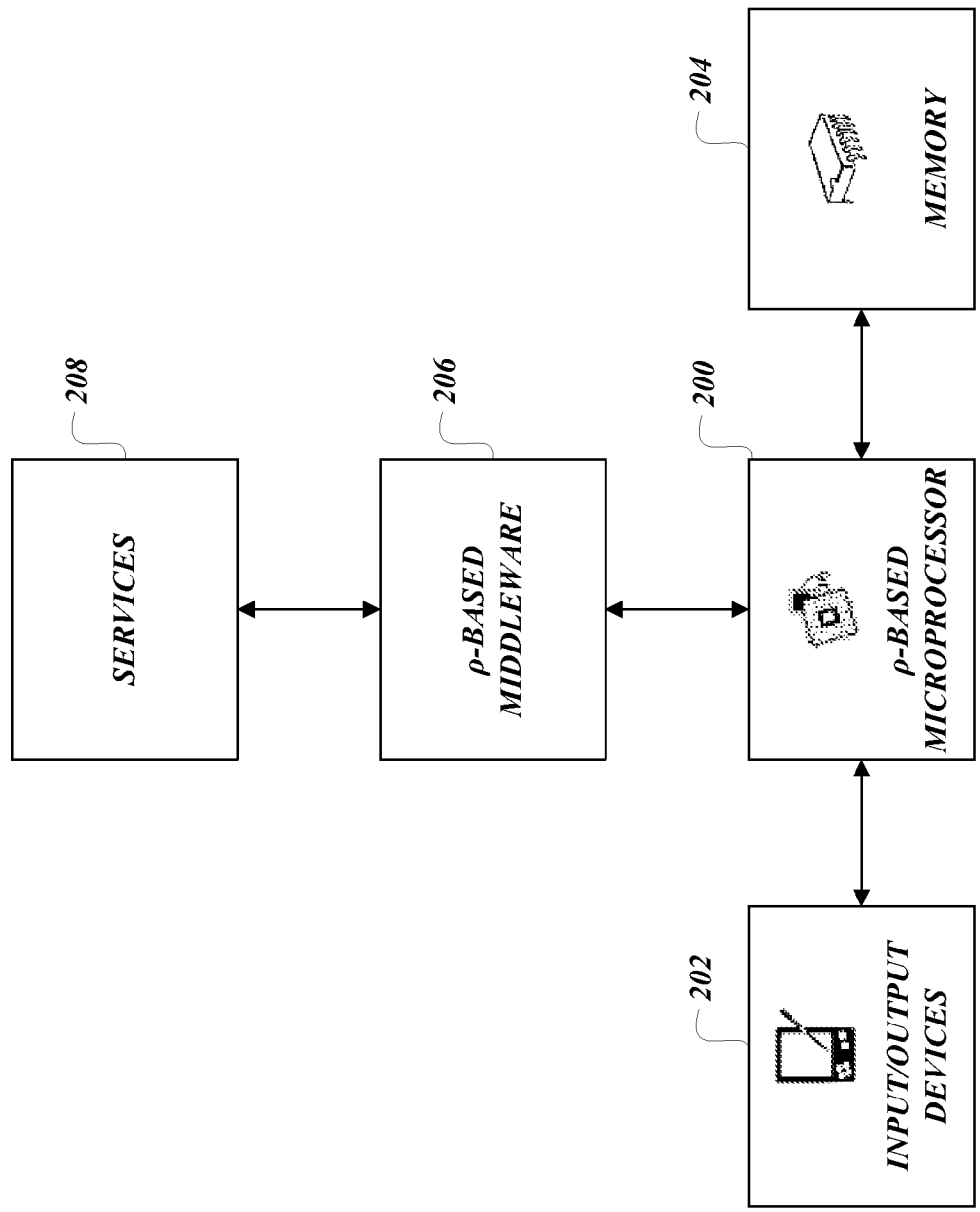
FIG. 2A is a block diagram illustrating services, which interface with a ρ-based middleware, for execution on a ρ-based microprocessor, according to one embodiment of the present invention.

FIG. 2A illustrates a computing device based on a ρ-based microprocessor 200. The term "microprocessor" means the inclusion of a central processing unit, digital signal processor, field programmable gate array, or any integrated circuits that can be programmed to perform arithmetic, logic, and decision processing. The ρ-based microprocessor 200 is a device that can be commanded to perform a variety of functions, such as data transfer, arithmetic, logic, and decision making. The ρ-based microprocessor 200 can be considered a central processing unit (CPU) on a single integrated circuit. The ρ-based microprocessor 200 can have several million transistors or more and is at the heart of computational devices such as personal computers. When power is applied to the ρ-based microprocessor 200 and a piece of memory 204 is added to the ρ-based microprocessor 200, all the pieces, excluding input/output devices 202, required for a computer are present. One or more ρ-based microprocessor 200 can form an array of ρ-based microprocessors. In one embodiment, the array of ρ-based microprocessors are on a single integrated circuit. In another embodiment, the array of ρ-based microprocessors are on multiple integrated circuits; the multiple integrated circuits are mounted on a single board. In a further embodiment, the array of ρ-based microprocessors are on multiple integrated circuits; the multiple integrated circuits are mounted on multiple boards; the multiple boards are housed on a single rack of a computer. In as yet a further embodiment, the array of ρ-based microprocessors are on multiple integrated circuits; the multiple integrated circuits are mounted on multiple boards; and the multiple boards are housed on multiple racks of multiple computers. In an addition embodiment, the array of ρ-based microprocessors includes a network for coupling one or more microprocessors. The network is selected from a group consisting of permanent connections and temporary connections.

Input/output devices 202 are pieces of hardware that can be used for providing data to the ρ-based microprocessor 200; for receiving data from same; or both. A personal digital assistant is an example of an input/output device. Some devices, such as a keyboard or a mouse, can be used only for input. Other devices, such as printers, can be used only for output. Most devices formed from the ρ-based microprocessor 200 do not necessarily require installation of software routines called device drivers to enable the transmission and receiving of data. The piece of memory 204 is a device where information can be stored and retrieved. Preferably, the piece of memory 204 refers to a computing device's main memory, the fast semiconductor storage (RAM) directly coupled to the ρ-based microprocessor 200.

ρ-based middleware 206 is software that sits between two or more types of software and translates the information between them. ρ-based middleware can cover a broad spectrum of software and generally sits between services 208 and a decentralized operating system. The ρ-based middleware 206 includes services, such as a name service, which generates new names as discussed in further detail below. Another piece of software that can be considered a ρ-based middleware 206 is a replication service. The ρ-based middleware 206 allows services 208 that are expressed using variants of π-calculus languages to better execute on the ρ-based microprocessor 200.

Services 208 are autonomous computation entities that exchange messages according to protocols, which are defined by each service. Services can be local to a computing system but can also be located at a remote computing system. Services can be accessed through a single trust domain but can also be accessed through another trust domain with its own security policy. Services 208 can be discoverable through a directory service but can also be discovered by services that are not directory services. Services 208 have ports identifiable by uniform resource indicators, which constitute a unique designation of a service. Ports of services are endued with behavioral types, which are specified by unilateral contracts. The preferred communication mechanism of services 208 is through programmatically wired ports. Wired ports are possible if the behavioral type of one port (of a service) is compatible with the behavioral type of another port (of another service). When ports are programmatically wired to each other, services 208 communicate by sending messages to each other. Simply put, unilateral contracts are expressed in a language, such as a variant of π-calculus, specifying an order of messages which flow in or out of services 208. For example, a file can be a service. A read-only file unilateral contract may include the following behavioral expression: REC F (read.F+drop).0, whereas a read-write file's unilateral contract may have the following behavioral expression: REC F (read.F+write.F+drop).0. In parsing the behavioral expressions, the term REC F indicates a recursion on a behavioral phrase F: the behavioral phrase F indicates the behavioral expressions inside the pairs of parentheses; the verb "read" indicates a read operation; the period symbol "." denotes a sequence in which the behavioral phrase before the period symbol occurs and after which the behavioral phrase following the period symbol will then occur; the plus sign symbol "+" indicates a choice between one or more behavioral phrases; the verb "write" indicates a write operation; the verb "drop" indicates the termination of the communication between two services; and the zero symbol ("0") denotes the termination of the behavioral expression.

FIG. 2B illustrates a portion of components comprising an internal architecture of the ρ-based microprocessor 200 in more detail. Each component is preferably represented as a ρ process that communicates through ports (each port being visually represented by a square). There are five major components of the p-based microprocessor 200: register array comprising 222, 224, and 210; a timing and control unit 214; an arithmetic and logic unit 226; an instruction register and decoder 212; and bus connections to the outside world 216, 218. When the p-based microprocessor 200 carries out a ρ instruction, it proceeds through five general steps. First, the timing and control unit 214 retrieves the ρ instruction from memory—for example, a ρ instruction to compose two processes running in parallel. Second, the timing and control unit 214 decodes the ρ instruction into electronic signals that control the p-based microprocessor 200. Third, the timing and control unit 214 fetches the data (the two names that are the literalization of the two processes). Fourth, the arithmetic and logic unit 226 performs the specific operation (the composition of the two processes by deliteralization of the two names). Fifth, the timing and control unit 214 saves the result (the composition of the two processes by literalizing the composition) into a register in the register array comprising 222, 224, and 210.

The ρ-based microprocessor 200 includes a variety of internal registers that are used to hold temporary data, memory addresses, instructions, and information about the status of the ρ-based microprocessor 200. For example, an instruction register 212 is used to hold instructions that the ρ-based microprocessor 200 is currently executing. Decoded instructions from the instruction register 212 control the rest of the ρ-based microprocessor 200, memory, and I/O through a timing and control unit 214 and external pins to the outside world. The instruction register 212 is a process with one or more ports that communicate with the timing and control unit 214, which is another process with its own ports. The instruction register 212 preferably communicates with an internal data bus 220, which can also be represented as a process with its own ports. The internal data bus 220 is used to carry information to or from memory in I/O. Preferably, the bus lines of the internal data bus 220 are bidirectional lines capable of transmitting information in both directions. Status registers 224 (which also communicate through ports) include temporary registers that are used to hold information from the memory for an arithmetic logic unit 226 (which also communicates through ports). The other input to the arithmetic logic unit 226 is from an accumulator 222 (using ports for communication). The status registers 224 include a flag register that is used to indicate operations of the arithmetic logic unit 226. The status registers 224 also include general-purpose registers for storing information. The accumulator 222 is used to accumulate answers after almost every arithmetic and logic operation performed by the arithmetic logic unit 226. One can consider the accumulator 222 to be the answer register because an answer is normally found here. Both the accumulator 222 and the status registers 224 are coupled to the internal data bus 220 for transmitting and receiving information. A program counter 210 (whose communication occurs through ports) is also coupled to the internal data bus 220. The purpose of the program counter 210 is to be used by the ρ-based microprocessor 200 to locate the next instruction to be executed. The program counter 210 allows the ρ-based microprocessor 200 to execute the next instruction from the memory. The ρ-based microprocessor 200 includes an address buffer 218 and a data buffer 216 for buffering information into and out of an address bus (not shown) and a data bus (not shown).

The term "process" used in accordance with various embodiments of the present invention means a dynamic representation of one or more computation entities that have the capability to evolve by performing actions or that allow other processes to evolve. In other words, the term "process" represents one among the dual nature of a computation entity. When a computation entity is static, it can be examined, such as by viewing a program. When a computation entity is mobile (as a process), it cannot be seen, but its behaviors can be expressed and verified by a ρ-calculus language 300 formed in accordance with various embodiments of the present invention. See FIG. 3A. The ρ-calculus language 300 includes the grammar, the rules for structural congruences, and the rules for operational semantics. The grammar of the language 300 is the system of rules that define the way in which the syntactical elements of processes and names are put together to form permissible programming statements. In other words, unless one can express correctly in the grammar of the language 300, one cannot communicate concepts, such as the literalization of a process to obtain a name, among other things. Once an expression is correctly formed, the rules of semantics connect the expression with meanings. Because processes are dynamic, the language 300 uses operational semantics to couple meanings to processes. In other words, processes evolve by acting or interacting with other processes. Understanding the meaning of an expression of the language 300 relates directly to understanding its operations. The rules for structural congruences allow the operational semantics of the language 300 to be simplified in that an expression can be likened to another expression. Thus, the number of rules for operational semantics can be kept small since these rules can be applied to permutations of expressions of the ρ-calculus language 300. Syntactical elements 302-314 of the ρ-calculus language 300 can each be used alone or can be combined in permutations to express computing nuances among processes. The syntactical rules for the ρ-calculus language 300 are described with reference to FIG. 3A; the structurally congruent rules are described with reference to FIGS. 8F-8H; and the operational semantic rules are described with reference to FIGS. 8J-8R.

Processes and names can be expressed using the ρ-calculus language 300 (after which they can be preferably placed in a ρ-service). Line 302 describes one definition for a process "P::=0," where the symbol P denotes a process; the symbol "::=" denotes that a definition for a term on its left-hand side is about to be commenced; and the syntactical element "0" denotes that the process is inactive or is terminated. Line 304 defines another syntactical element for the process represented by the symbol P "X[X]"; the symbol X is described on line 314 and denotes a name in the ρ-calculus language 300; the symbol X[X] denotes that a computation entity, such as a name represented by the symbol X, can be sent via the name represented by the symbol X. Line 306 provides another definition for a process P. The syntactical element on line 306 describes an input action "X(X).P," where the symbol X denotes a name as described on line 314; the symbol "X (X)" denotes an action that can receive any name via a name represented by X and continue as another process represented by P with the received name substituted for a name enclosed between the parentheses (X). Another syntactical element for a process represented by P is described on line 308 as "LIFT X.P"; where the symbol X denotes a name as described on line 314; the symbol P denotes a process as defined by syntactical elements 302-312; and the syntactical element "LIFT X.P" denotes that a literalization of a process represented by the symbol P is sent or is made available at a name represented by the symbol X. The LIFT operator allows dynamic composition of processes before reifying them as names for use in communication. Line 310 provides another syntactical element for a process represented by the symbol P "P|P," where the symbol P represents a process as defined by syntactical elements 302-312; and the vertical bar "|" denotes a composition of two processes with each process proceeding independently and interacting via share names (in other words, two processes running in parallel or concurrently with one another). The syntactical element ">X<" illustrated on line 312 denotes a deliteralization of a name represented by the symbol X. Line 312 illustrates one nature of a duality of natures of a process represented by the symbol P, which is a deliteralization of a name represented by the symbol X. The other nature is described on line 314 in which a name represented by the symbol X is defined to be a literalization of a process <P> represented by the symbol P. These reflective natures of processes and names in the ρ-calculus language 300 reveal the duality of a computation entity in that it can be both a process and a name.

Figure 3B:
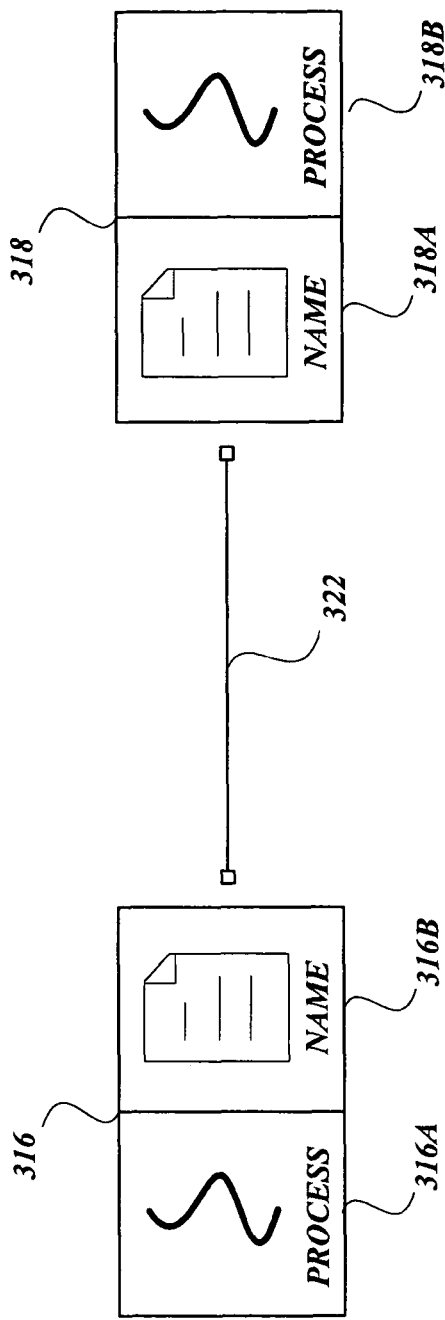
FIG. 3B is a pictorial diagram showing the reflective properties of ρ-calculus, according to one embodiment of the present invention.
Figure 3A:
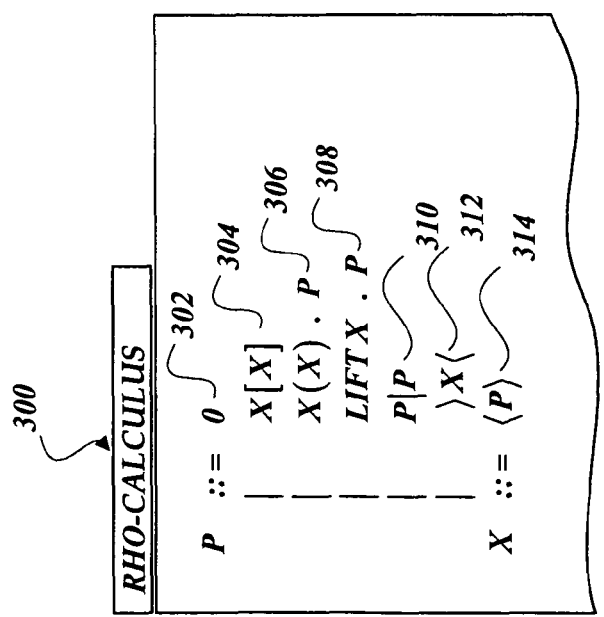
FIG. 3A is a textual diagram illustrating a portion of ρ-calculus, which is a process programming language, formed in accordance with one embodiment of the present invention.

FIG. 3B pictorially illustrates the dual nature of a computation entity 316. The computation entity 316 is a process 316A, which is expressed using the syntactical elements 302-312 of the ρ-calculus language 300. As discussed hereinbefore, the process 316A represents the dynamic nature of the computation entity 316. The static nature of the computation entity 316 is a name 316B, which can be expressed using the syntactical element as illustrated on line 314 of the ρ-calculus language 300. Once the process 316A is literalized or transformed into a name 316B, such a name can be sent over a port 322 in a communication session between two processes. See the syntactical element X[X] as expressed on line 304. Upon receiving the name 316B (for the sake of distinguishing the name 316B after communication, a new reference number 318A is used) at the other end of the port 322, the name 318A can be mathematically deliteralized to obtain a process 318B, which is equivalent to the process 316A. Collectively, a computation entity 318 is both the name 318A and the process 318B.

A variant ρ-calculus language 400, which is based upon the ρ-calculus language 300, allows control over the production of names using typed processes. See FIG. 4A. The variant ρ-calculus 400 includes a number of syntactical elements similar to those described in connection with the ρ-calculus language 300. For example, a process represented by the symbol P includes an inactive process or a terminated process represented by the syntactical element "0." See line 402. Line 404 describes an output process represented by the syntactical element "X[Y]"; where the symbol X is defined on line 414; the symbol Y is defined on line 416; and together the syntactical element "X[Y]" denotes that a name represented by the symbol Y is sent via a name represented by the symbol X. Line 406 describes the syntactical element "X(Z).P"; where the symbol X represents a name as defined on line 414; the symbol Z represents another name described on line 418; the symbol P represents a process whose definitions are described on line 402-412; and together the syntactical element "X(Z).P" denotes that a name represented by the symbol X can receive any other name after which a process represented by the symbol P will be executed with the received name substituted for the name represented by the symbol Z. The syntactical element "LIFT X.P" described on line 408 provides another definition for the process represented by the symbol P. In essence, line 408 describes that a process represented by the symbol P can be lifted or be made available at a name represented by the symbol X. Concurrent execution of processes or a composition of two processes running in parallel is described on line 410 as "P|P", where the symbol P on either side of the vertical bar "|" represents two processes running in parallel. Line 412 describes a syntactical element >X< that deliteralizes a name represented by the symbol X so as to obtain a process represented by the symbol P. The syntactical element "<P>" describes the literalization of a process represented by the symbol P, after which a name represented by the symbol X is obtained. See Line 414. The syntactical element <P>,P:T at line 416 describes that the production of a name represented by the symbol Y is similar to that on line 414. However, the production of the name represented by the symbol Y is constrained in that the process represented by the symbol P must be of an element of a certain type represented by the symbol T. One suitable type T includes a type that selects processes that are pattern recognizers but other suitable types can be used. The symbol colon ":" denotes that a process represented by the symbol P belongs to a certain type represented by the symbol T without which the literalization <P> of the process represented by the symbol P is not possible. The name represented by the symbol Z is similarly constrained on line 418 with the syntactical element <P>,P:U. The name represented by the symbol Z is produced by literalizing the process <P> represented by the symbol P, but such a process P must be an element of a type represented by the symbol U. One suitable type U includes a type that selects processes that represent values but the type U is not limited to such processes and other suitable types can be used. Types represented by the symbols T, U allow minute control over processes that can evolve into names, which are the primitives of communications in a process-based environment.

FIG. 4B illustrates two computation entities 420, 422. The computation entity 422 includes a process 422A, but can be literalized to transform into a name 422B if the process 422A is of a type suitable for literalization. The name 422B can be sent over a port 424. (To simplify the discussion, the name 422B is referenced by a new part number 428B when it is received by the end of the port 424.) When the name 428B is received, the name 428B can be deliteralized to obtain the process 428A, which is equivalent to the original process 422A. The computation entity 420 includes a process 420A but no corresponding name can be constructed because the process 420A is not an element of a process type that can evolve into a name. Thus, the literalization of the process 420A is inhibited because the type to which the process 420A belongs is not allowed to construct a name in accordance with the variant ρ-calculus language 400.

FIG. 5A illustrates a portion of another variant ρ-calculus language 500, which is based on the ρ-calculus languages 300, 400. Many syntactical elements of the variant ρ-calculus 500 are similar to ρ-calculus languages 300, 400. For example, line 502 defines an inactive or stop process, which is similar to those defined on lines 302, 402. Line 504 defines an output process, which is similar to those defined on lines 304, 404. Line 506 defines an input process which is followed by a process P, which is similar to those defined on lines 306, 406. Line 508 defines a lift action similar to those defined on lines 308, 408. Line 510 defines a composition of processes running in parallel with each other, which is similar to those defined on lines 310, 410. Line 512 defines a deliteralization of a name to obtain a process represented by the symbol P similar to those defined on lines 312, 412. Line 514 defines a name represented by the symbol X as "<P>,#(P)≦K"; where the symbol P represents a process defined by syntactical elements 502-512; the symbol "<P>" denotes a literalization of a process represented by the symbol P; the symbol "," denotes that a constraint on the literalization of a process represented by the symbol P is about to commence; the symbol "#" denotes a function that takes a process as an argument and produces the size of the syntax tree of the process; the symbol "#(P)" denotes that the size of the syntax tree for the process represented by the symbol P is executed; the symbol "≦" denotes that the size of the syntax tree of the process represented by the symbol P must be less than or equal to a certain constant; and the symbol K represents a constant that is the maximum size of the syntax tree for the process represented by the symbol P that is allowed to be literalized. Line 514 allows the variant ρ-calculus language 500 to constrain, confine, or limit the size of a process that can be literalized to produce a name so as to participate in actions or interactions with other processes.

FIG. 5B visually illustrates the constraint that the variant ρ-calculus language 500 can use to limit the production of names. FIG. 5B illustrates two computation entities 520, 522 and their corresponding syntax trees 520C, 522C. The computation entity 520 has a process 520A, but is inhibited from constructing a corresponding name 520B. The computation entity 522 includes a process 522A but has liberty in constructing a corresponding name 522B. Each syntax tree 520C, 522C is a hierarchical structure in which a node represents an operation and the children of the node represent the arguments of the operation. For example, node 520E of the syntax tree 520C stores an assignment symbol "=". The children of node 520E include a variable ACCELERATION 520D and a division symbol "/" 520H. The division symbol "/" 520H forms another node 520H, which has two children. MILES 520F is one child of node 520H and the other child is HOUR 520G. HOUR 520G is coupled to another node 520I which stores a division operation "/". Node 520I has another child HOUR 520j.

Regarding the syntax tree 522C, node 522E stores an assignment symbol "=". A child of node 522E includes a variable VELOCITY 522D. Node 522H is a child of node 522E and stores a division operation "/". There are two children of node 522H, a variable MILES 522F, and a variable HOUR 522G. The syntax tree 522C is smaller in size than the syntax tree 520C. In accordance with the constraint defined on line 514, the computation entity 522 can literalize the process 522A to construct the name 522B because the syntax tree 522C is below a certain threshold. Not so with the computation entity 520 whose process 520A has a syntax tree with a size that exceeded the threshold.

FIG. 6A illustrates a replication service 600 formed using one of the variant ρ-calculus languages 300-500. In traditional π-calculus mathematics, the symbol "!P" denotes an infinite composition of processes running in parallel with each other. Such infinite computation entities are theoretically incompatible for execution on integrated circuits, such as microprocessors, with finite resources. Various embodiments of the present invention remove such a primitive from the language of ρ-calculus 300-500. One can still emulate the notion of infinite composition by writing a service in the ρ-calculus language 300-500. The replication service 600 is an example. Line 602 describes that the infinite composition "!P" is defined mathematically to be "LIFT X.(X(Y).(>Y<|X[Y])|P)|X(Z).(>Z<|X[Z])". The mathematical term LIFT X.(X(Y).(>Y<|X[Y])|P) is a process running in parallel with another process represented by the mathematical term X(Z). (>Z<|X[Z]).

FIG. 6B dynamically illustrates when the replication service 600 is executing. The mathematical term (X(Y).(>Y<|X[Y])|P) is denoted by a process P1 606, where the term X(Y) denotes that a name can be received on a channel X after which such a name will be substituted for the name Y; a process >Y< will run in parallel with the process X[Y] after the process X(Y) has acted; the term >Y< denotes the deliteralization of the name Y to obtain a process which will run in parallel with the process X[Y]; the term X[Y] denotes that the name Y can be sent along a channel represented by the name X; and the process composition X(Y). >Y<|X[Y]) runs in parallel with another process P.

The process 604 LIFT X.(X(Y).(>Y<|X[Y])|P) can be mathematically reduced to X [<P1>], where the term P1 is the composition of processes (X(Y).(>Y<|X[Y])|P). The mathematical term X [<P1>] means that the process P1 is literalized and made available at a port represented by the name X. When the process P1 is literalized and is made available at the name X, a process X(Z) receives the term <P1> and will be substituted for the name Z. A resolution of the process X(Z) includes the term <(X(Y).(>Y<|X[Y])|P)>. When the process X(Z) 608 has acted, a process >Z< 610 becomes active. The process >Z< 610 denotes that the name Z is deliteralized to reconstitute the process P1 606, which is mathematically described as (X(Y).(>Y<|X[Y])|P). The process (X(Y). (>Y<|X[Y])|P) will now be running in parallel with another process X[Z] 612. The process X[Z] 612 is similar to the reduction of the process LIFT X.(X(Y).(>Y<|X[Y])|P) 604 in that the name Z is a substitution for the literalization of the process P1 606 and is sent out on a port named X. The replication or infinite composition of processes are realized when the term X(Y) of the process >Z< 610 picks up the name Z being output by the name X. The series of actions and interactions in the composition of processes (X(Y).(>Y<|X[Y])|P) occur once again, hence emulating the replication primitive of π-calculus.

FIG. 7A illustrates a name service 700. The name service 700 is written in one of the ρ-calculus languages 300-500. The name service 700 illustrates the ease with which the creation of new names can be placed in a service instead of being a primitive of the language to avoid or reduce the problems of implementation of new names in π-calculus. The term N(I, X, F, R) denotes a signature 702 for the name service 700. Four names, I, X, F, and R, are provided to the signature 702. The first name is sent on the port I; the rest of the names are sent on port X; and port F is used to receive a new name that is distinct from all names provided to the name service 700.

Line 704 defines a summand I(Y).(LIFT R.(Y[<0>])|N(I, X, F, R)), which describes one capability of the name service 700. Line 704 expresses processes that act and interact for the initialization capability of the name service 700. Line 706 is another summand X(Y).R(S).(LIFT R.(Y[<0>]|>S<)|N(I, X, F, R)), which expresses the main capability of the name service 700. Line 708 defines yet another summand F(B).R(S). LIFT B.(<0>[<0>]|>S<), which expresses processes that act and interact for finalizing in the production of a name that is different from other names provided to the name service 700.

FIG. 7B visually illustrates the actions and interactions of the components of the summands of the name service 700. The name service 700 is collectively represented by a process P1 710. A process I(Y) 712 becomes active to receive any name via a name I and consequently substitutes the received name with the name Y. Next, a composition of processes (LIFT R.Y[<0>]|P1) 714 becomes active. The composition of processes 714 is reduced to a composition of processes R[<Y [<0>]>]|P1, where the term <0> denotes the literalization of an inactive process 0; the term Y [<0>] denotes that literalization of the process 0 is made available at the name Y; the term R[<Y[<0>]>] denotes the literalization of a process Y[<0>] and such a literalization is made available at a name R (which represents a register for storing accumulated information); and the term |P1 denotes that the process P1 710 is running in parallel with the process R[<Y[<0>]>]. Processes 712, 714 illustrate the capability of the name service 700 at the summand described on line 704.

A process X(Y) 716 expresses the first action in the summand shown on line 706 and indicates another capability of the name service 700. The term X(Y) denotes that any name can be received via the port X after which such a received name is substituted for the name Y. After the process X(Y) 716 has acted, another process R(S) 718 is activated. The term R(S) denotes that any name can be received by a name R after which such a received name is substituted for another name S. After the process R(S) 718 has acted, another composition of processes (LIFT R.(Y[<0>]|>S<)|N(I,X,F,R)) 720 becomes active. The composition of processes 720 can be mathematically reduced to another composition of processes, R[<(Y [<0>]|>S<)>]|P1 where the term <0> denotes the literalization of an inactive process 0; the term Y[<0>] denotes the sending of the term <0> at a port Y; the term | denotes that the process Y[<0>] is executed in parallel with another process;

the term <S> denotes that the name S is being deliteralized; the term <(Y[<0>]|>S<)> denotes the literalization of a composition of processes (Y[<0>]|>S<); the term R[<(Y[<0>]|>S<)>]|P1 denotes that the literalization of composition processes (Y[<0>]|>S<) is made available at a name R; and the term |P1 denotes that the name service 700 is running in parallel with the process R[<(Y[<0>]|>S<)>]|P1. Processes 716, 718 and 720 are components of the summand at line 706, which describes the main capability of the name service 700.

The process F(B) 722 allows any name to be received via the port F after which the received name is substituted for the name B. The name B represents a callback port from which one can obtain a name which is different than other names presented to the name service 700. After the process F(B) 722 has acted, another process R(S) 724 becomes active. The process R(S) 724 receives any name via the name R after which the received name is substituted for the name S. The process R(S) 724 refers to a register which stores scratch information relating to the accumulated information regarding a new name. After the process, R(S) 724 has acted, another process LIFT B.(<0>[<0>]|>S<) 726 becomes active. The process LIFT B.(<0>[<0>]|>S<) 726 can be reduced to a process B[<(<0>[<0>]|>S<)>], where the term 0 denotes an inactive process or termination of a process; the term <0> denotes the literalization of the inactive process 0; the term <0>[<0>] denotes that a name obtained from the literalization of the inactive process 0 is used as a port to output a literalization of the inactive process 0. The term (<0>[<0>]|>S<) denotes that the process <0>[<0>] is running in parallel with another process >S<; the term >S< denotes that the name S is being deliteralized; and the term B[<(<0>[<0>]|>S<)>] denotes that the literalization of the composition of processes (<0>[<0>]|>S<) is made available at a port B.

Figure 8A:
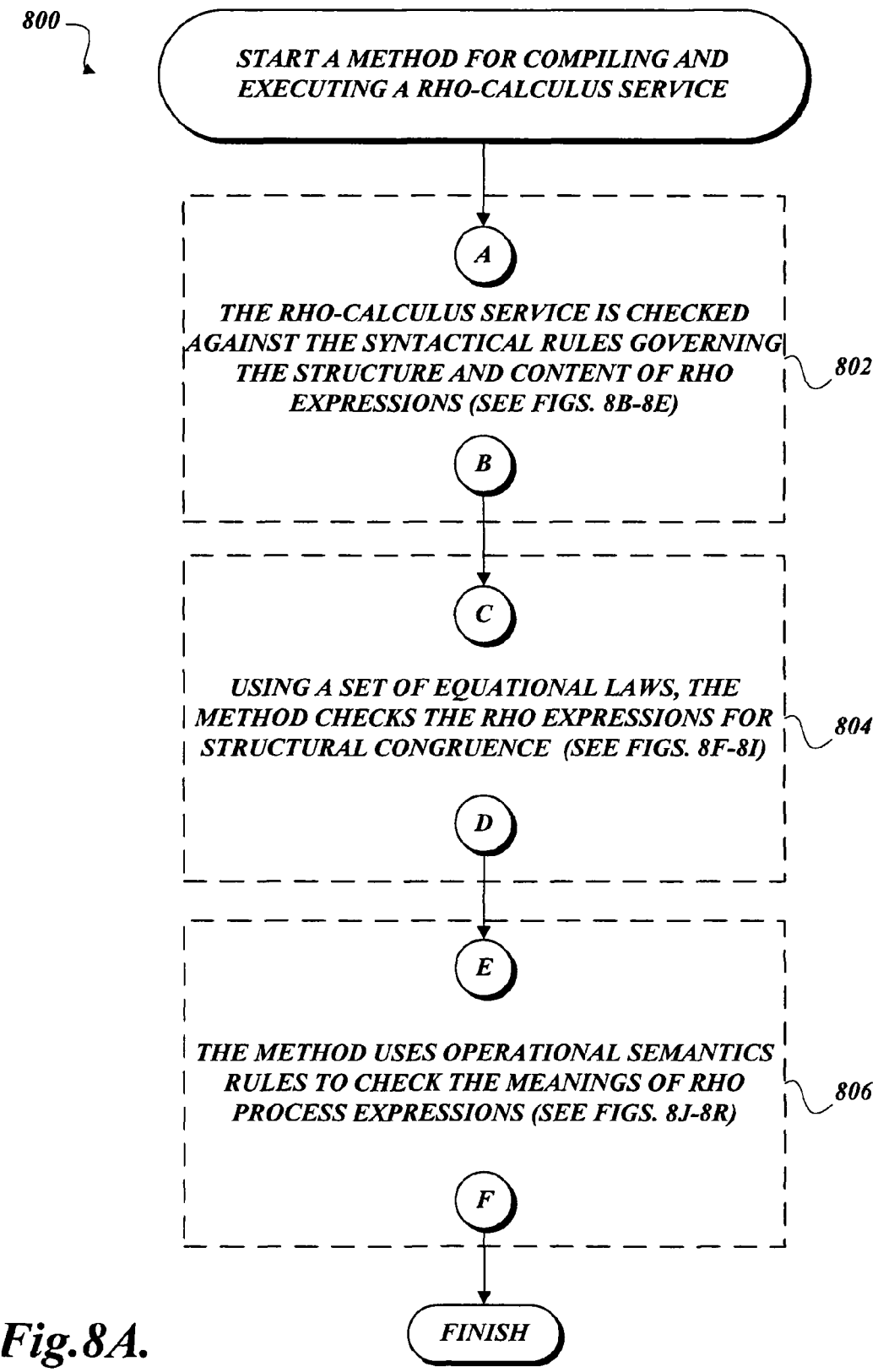
FIGS. 8A-8R are process diagrams illustrating an exemplary method formed in accordance with this invention for compiling a ρ-calculus service or executing a ρ-calculus service.
Figure 8B:
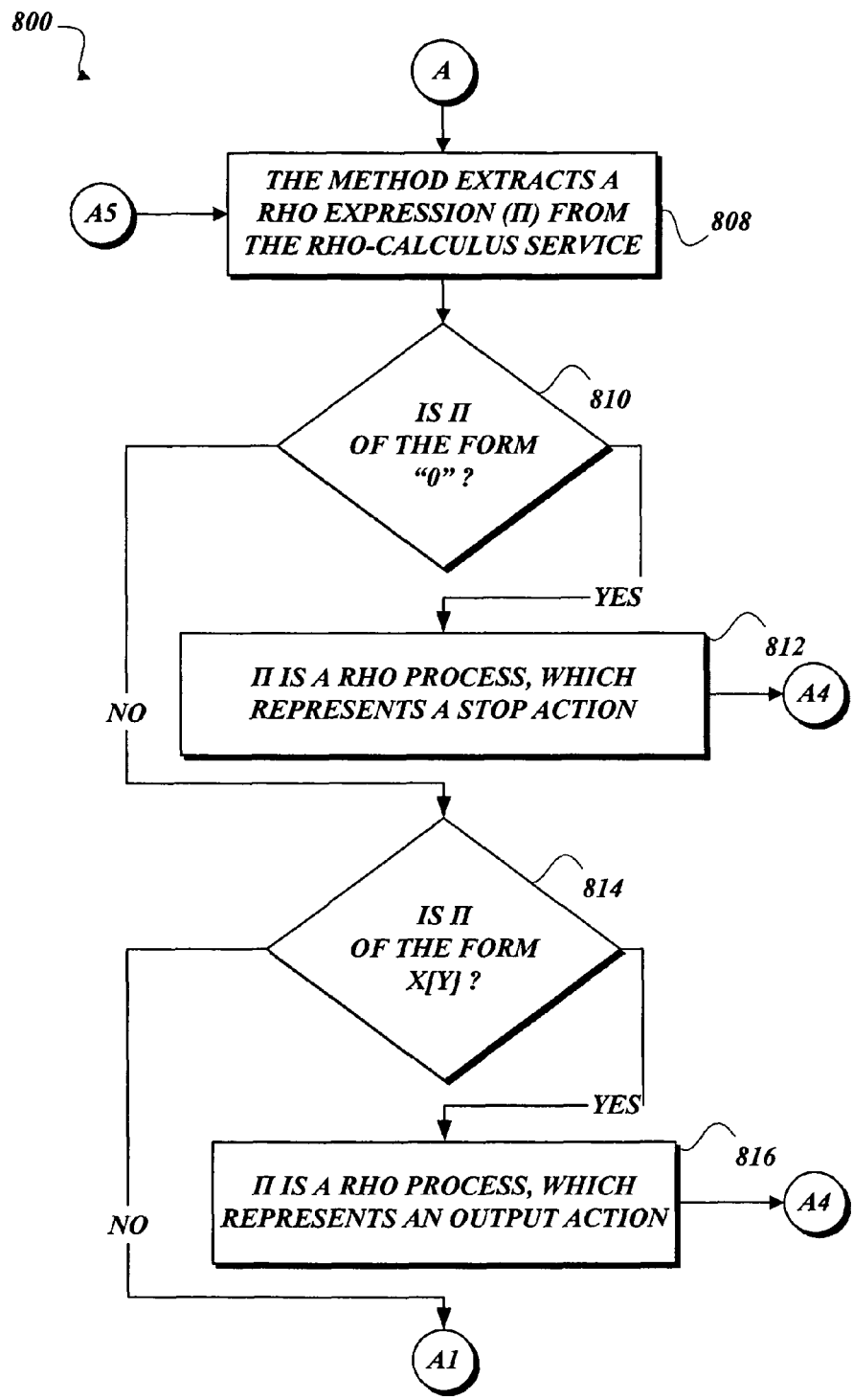
Figure 8C:
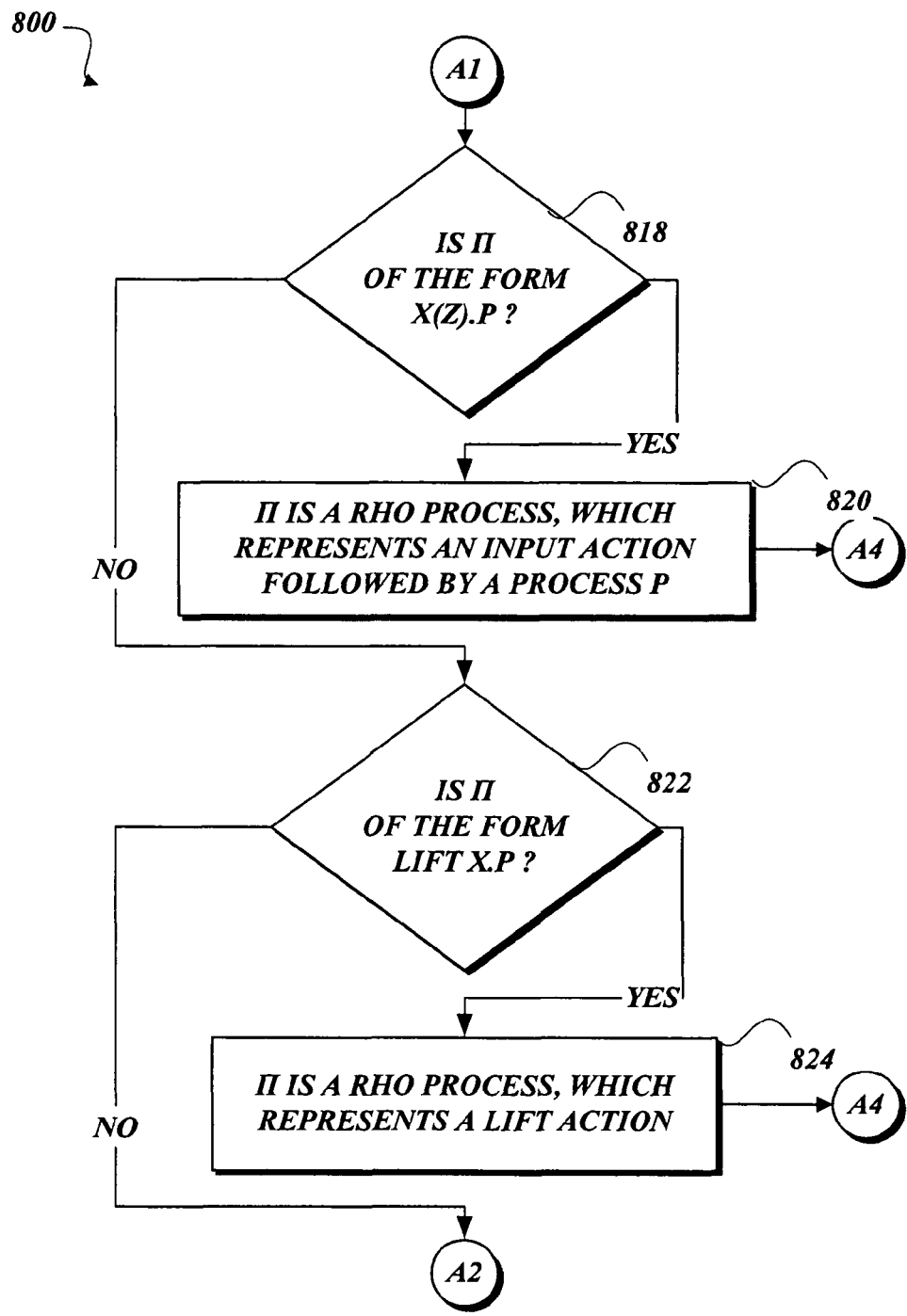
Figure 8D:
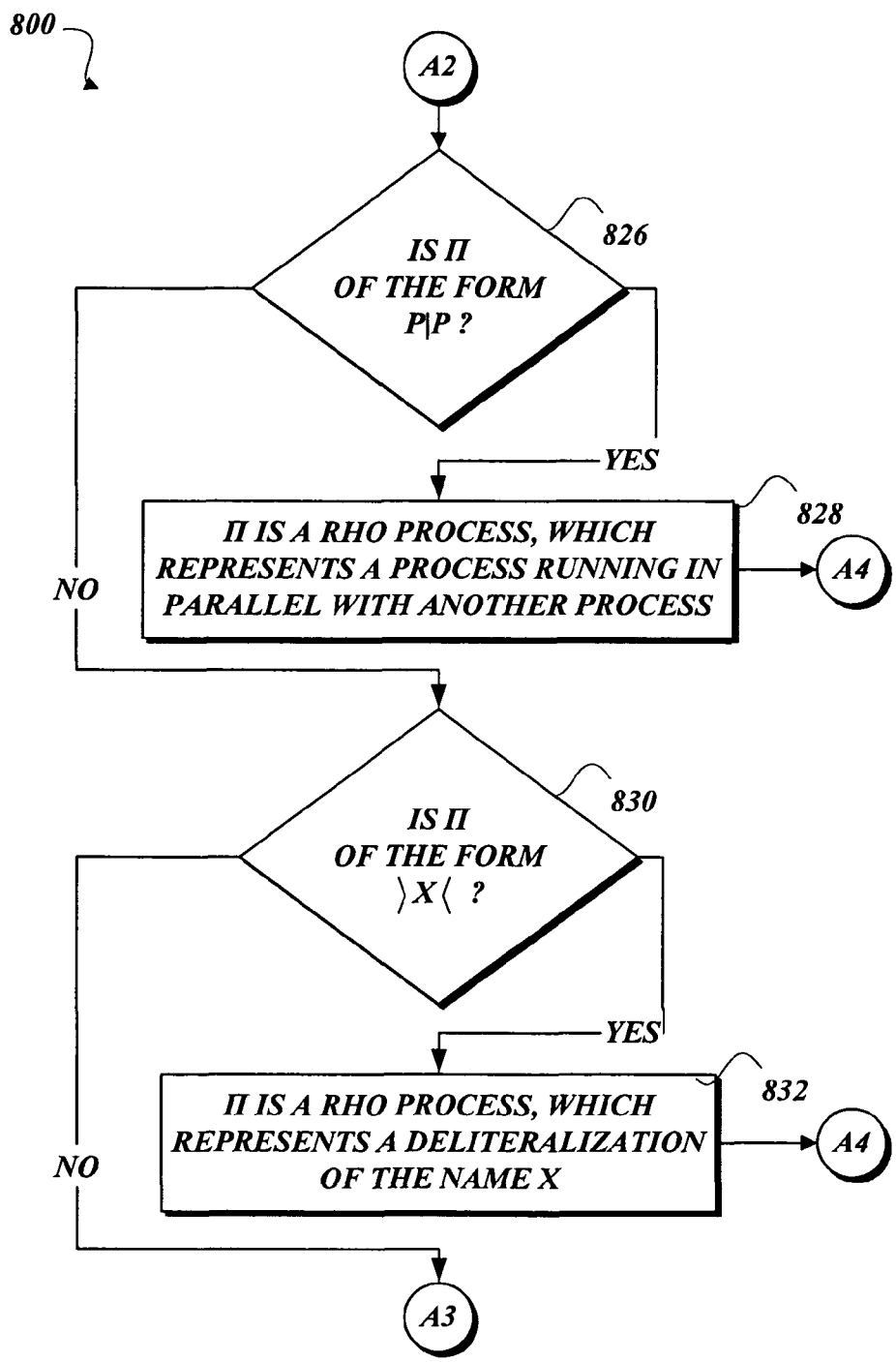
Figure 8E:
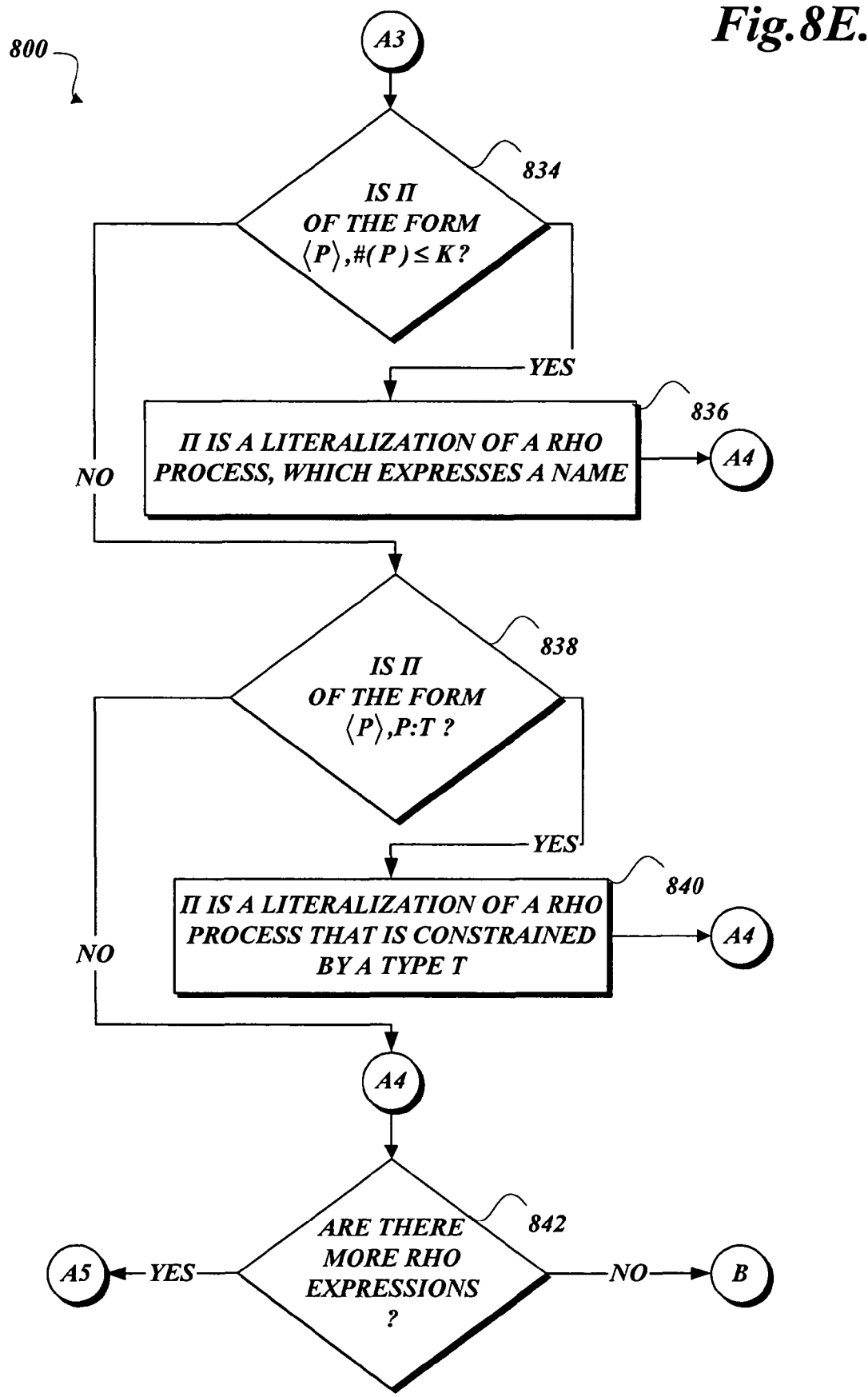
Figure 8F:
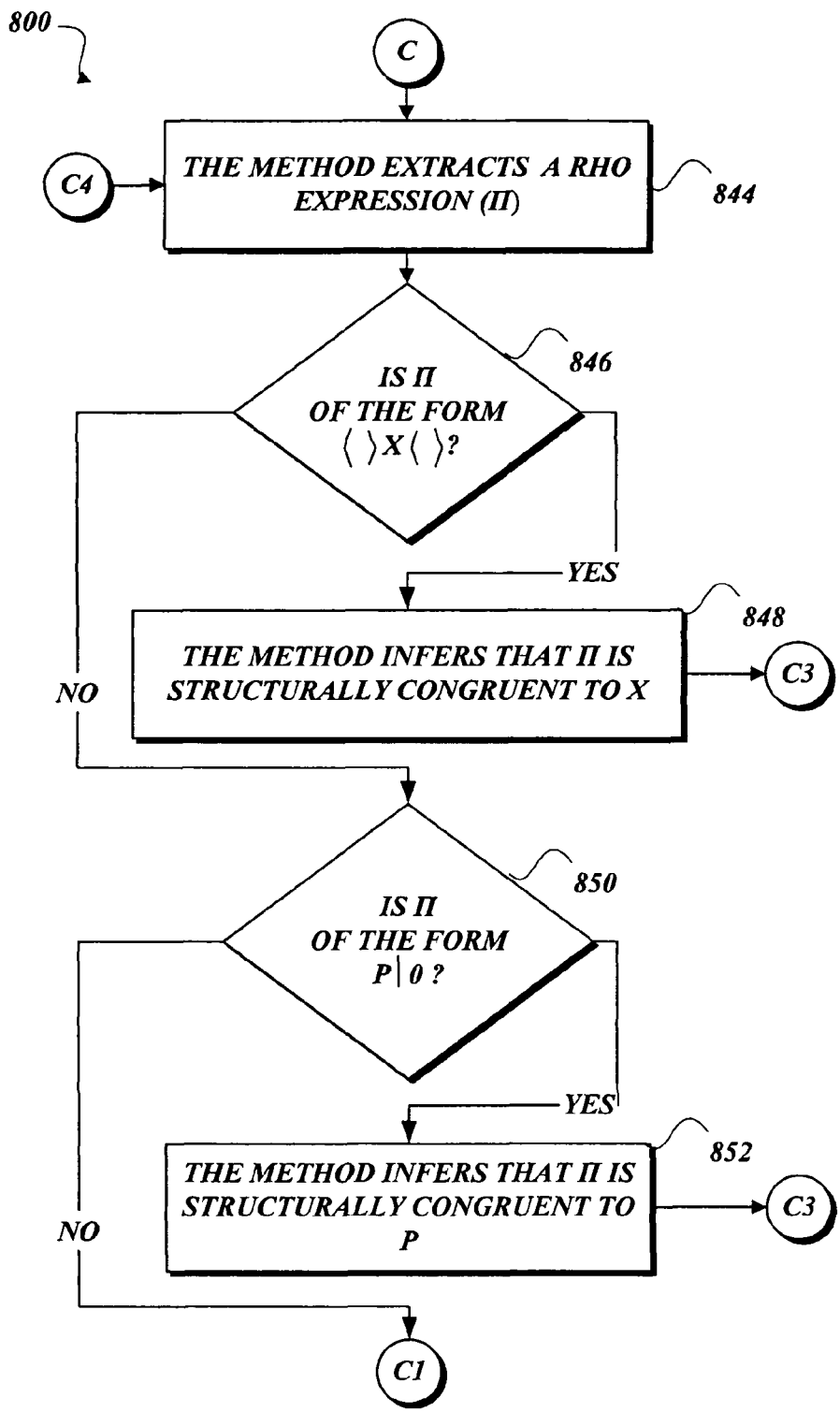
Figure 8G:
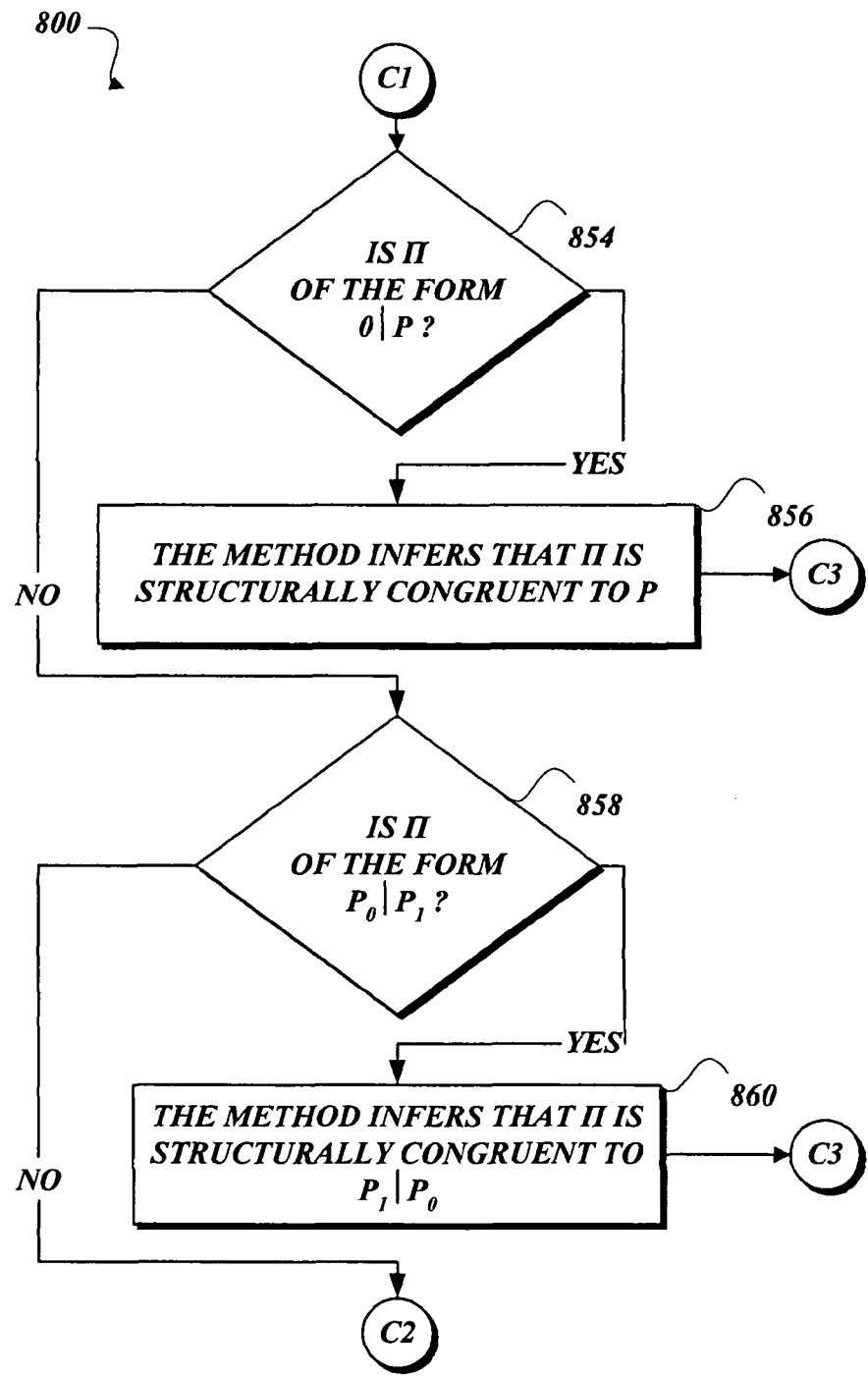
Figure 8H:
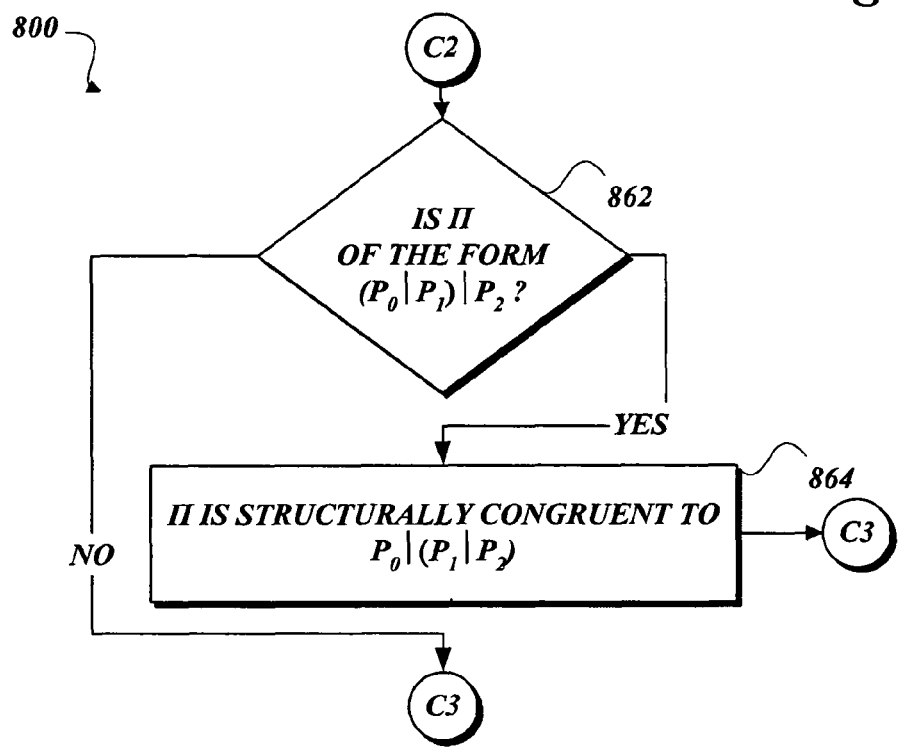
Figure 8I:
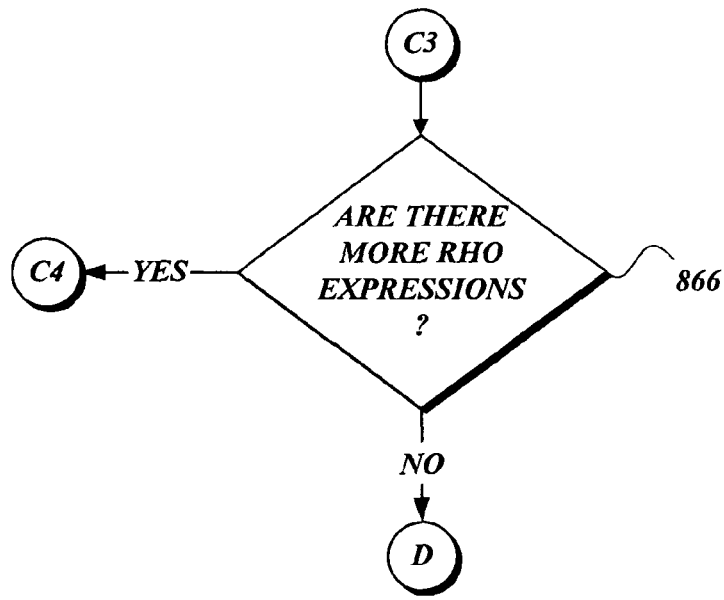
Figure 8J:
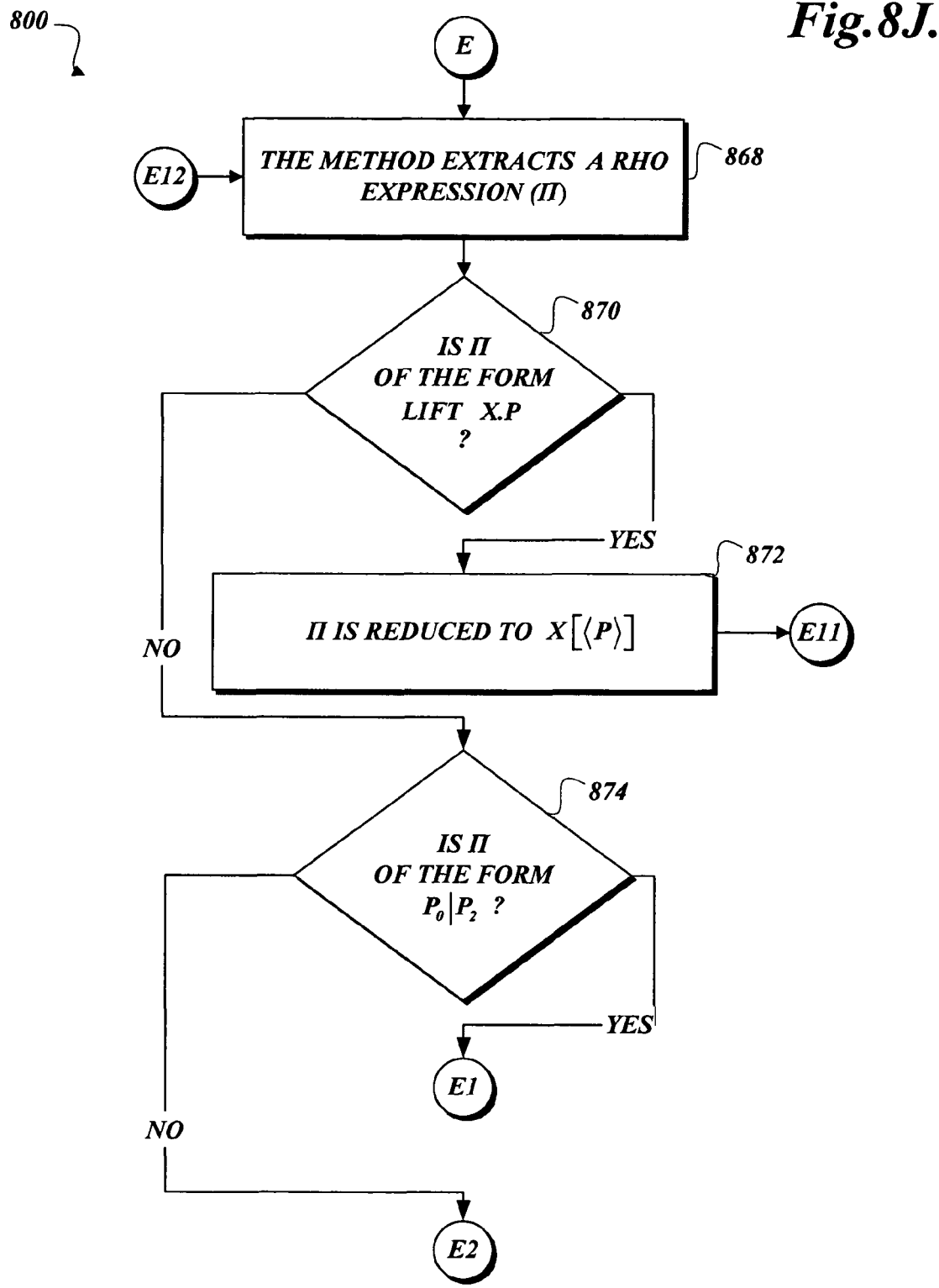
Figure 8K:
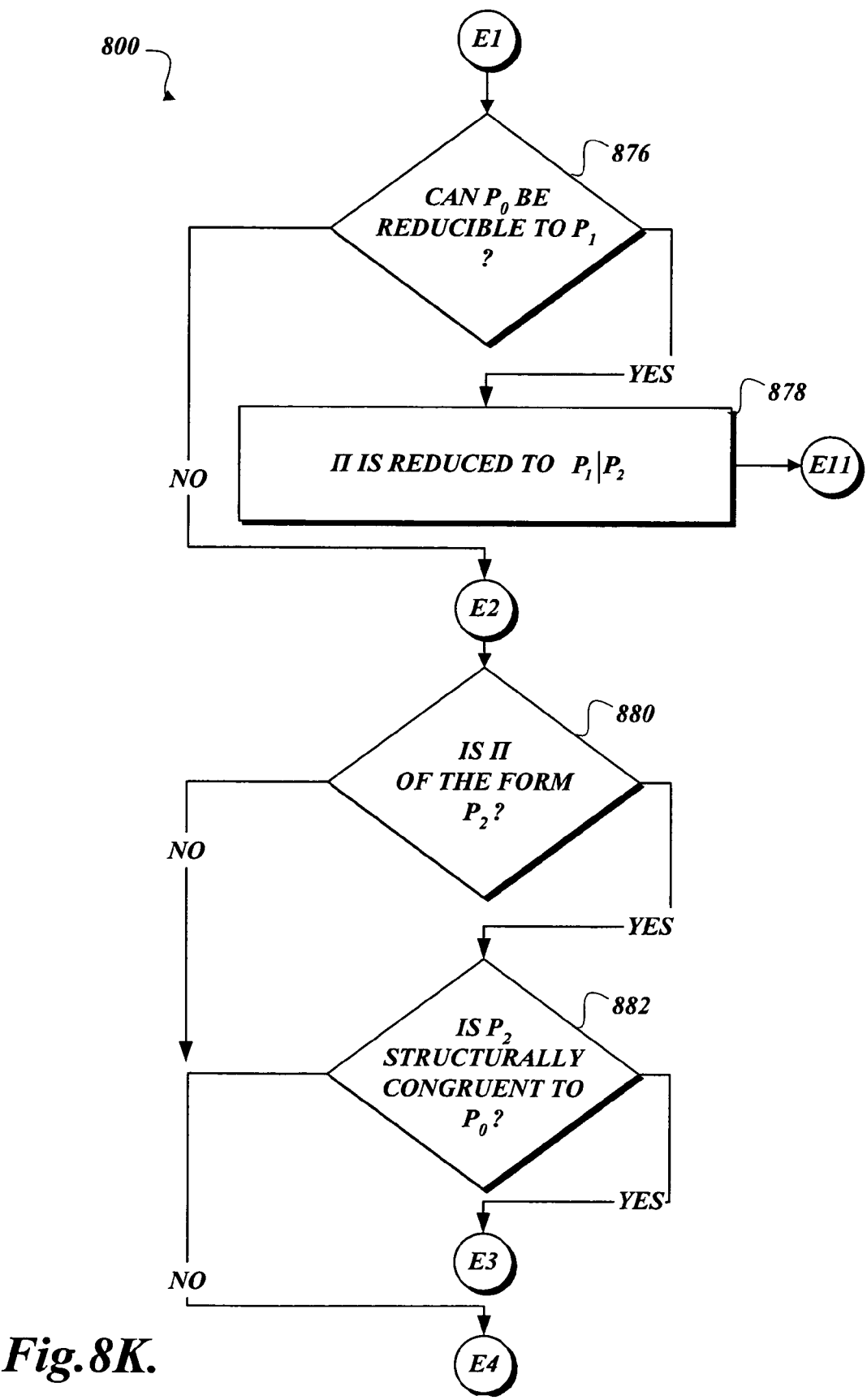
Figure 8L:
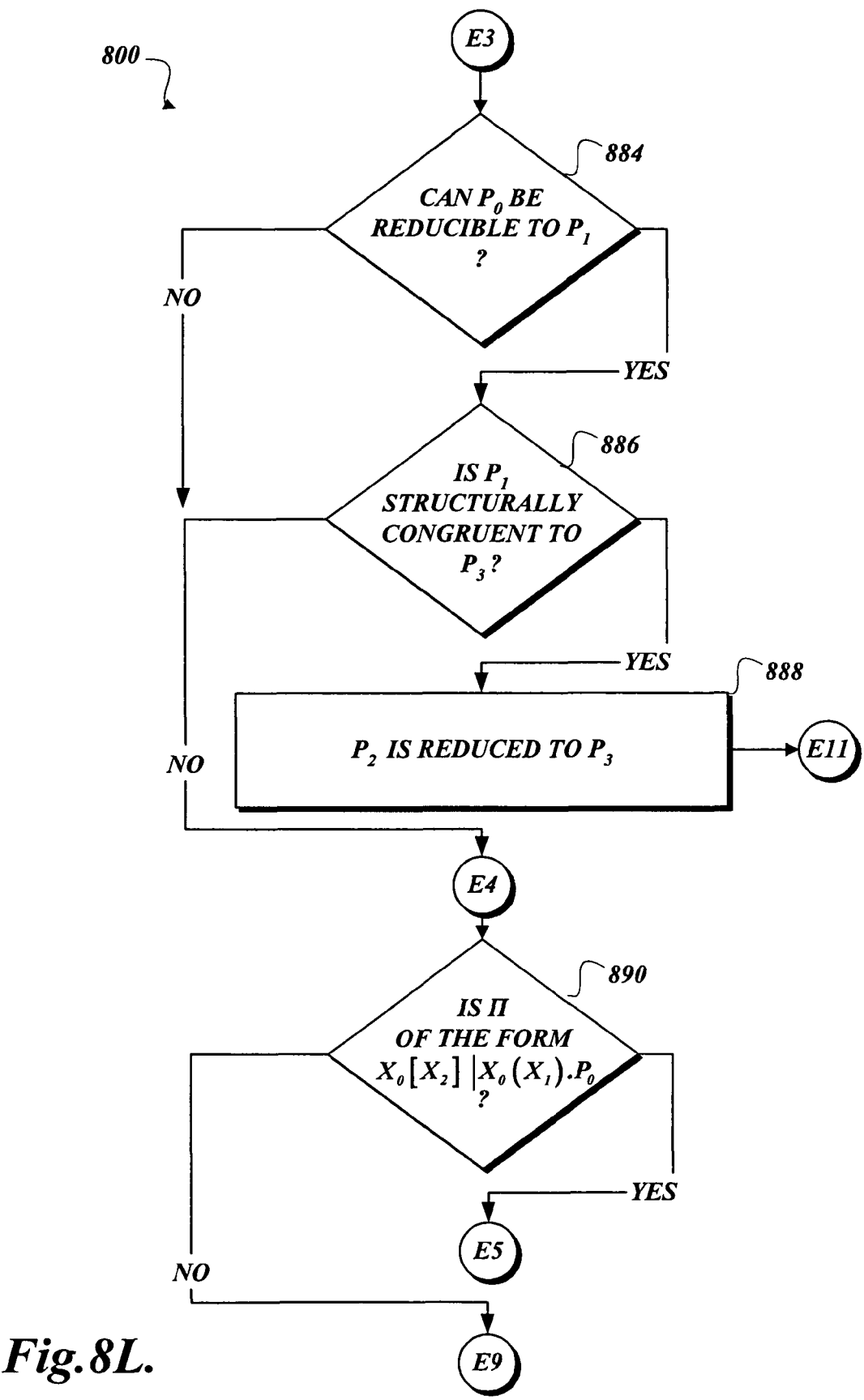
Figure 8M:
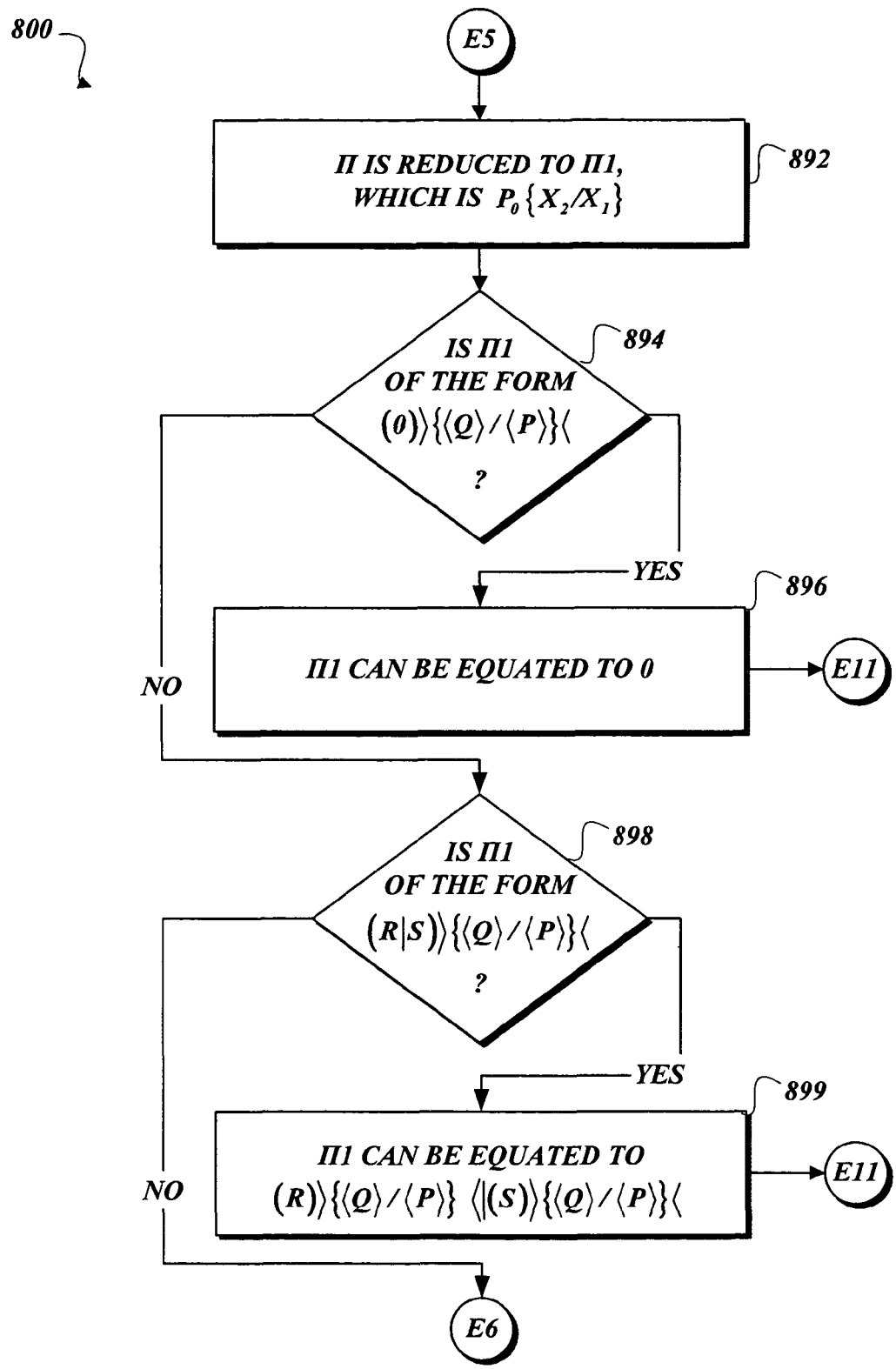
Figure 8N:
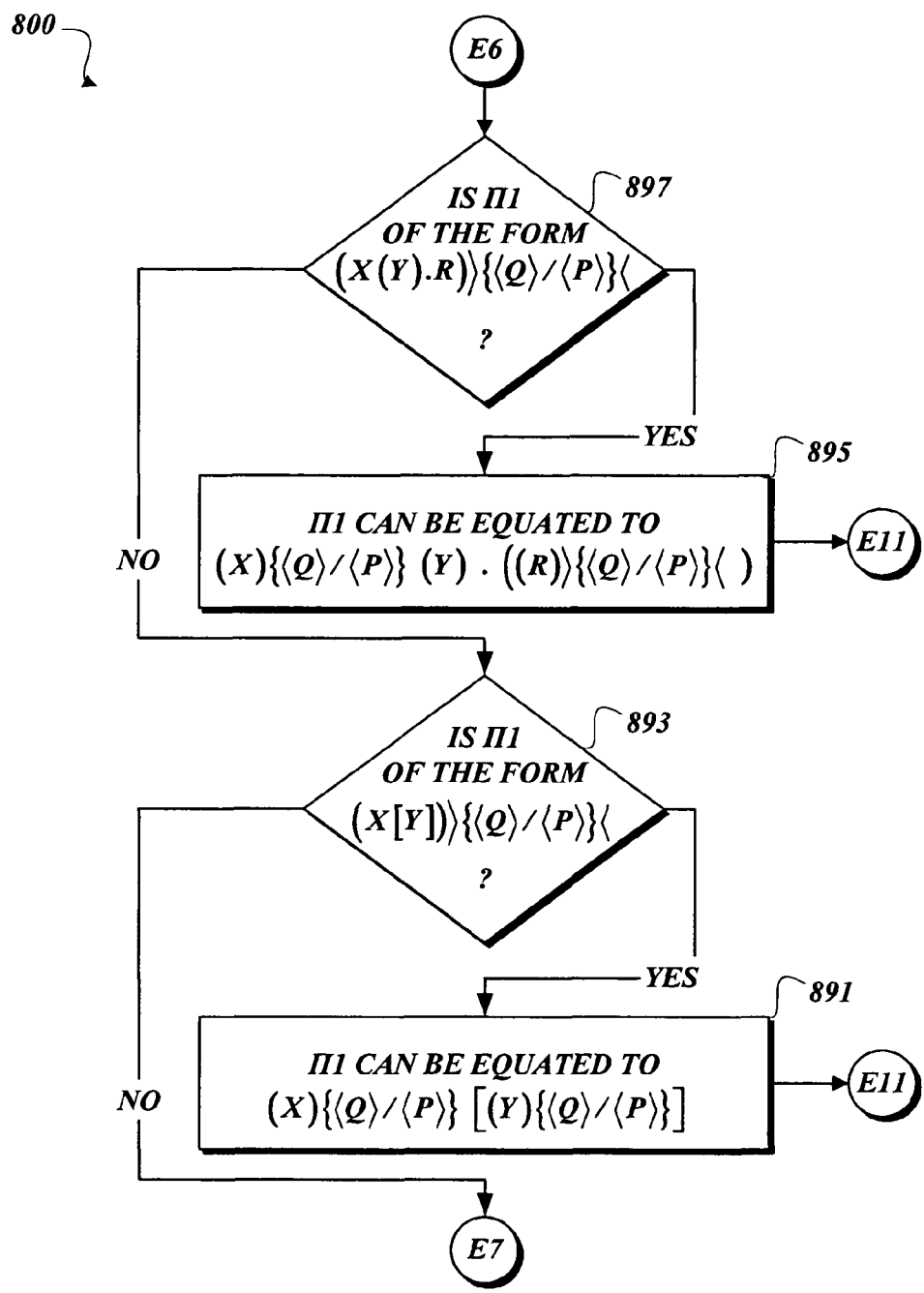
Figure 8O:
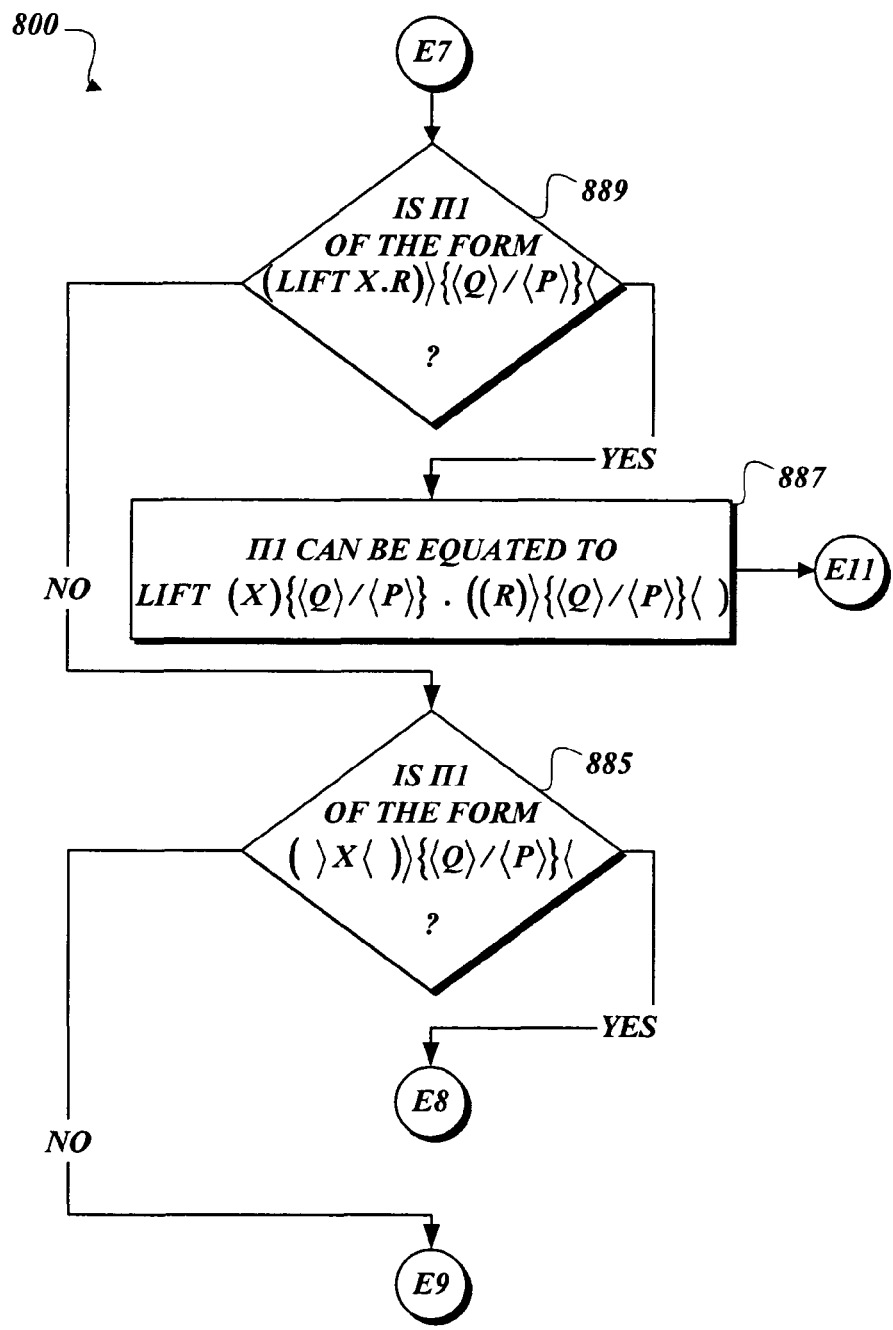
Figure 8P:
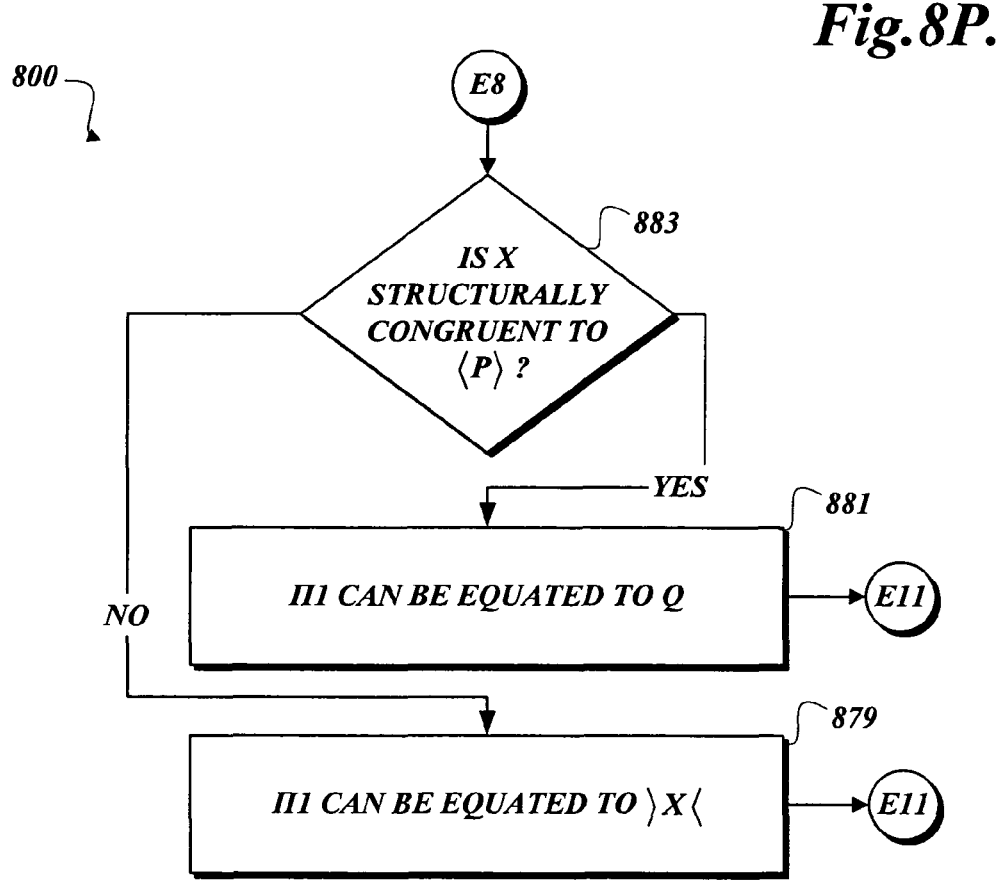
Figure 8Q:
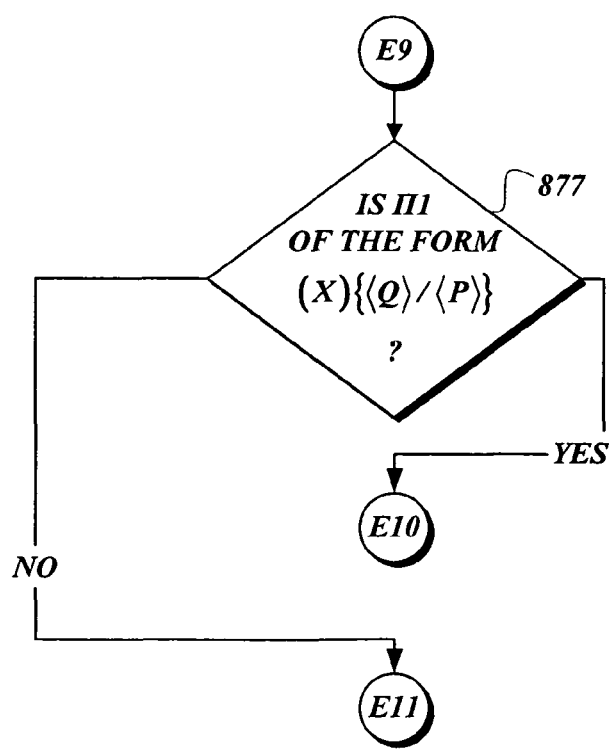
Figure 8R:
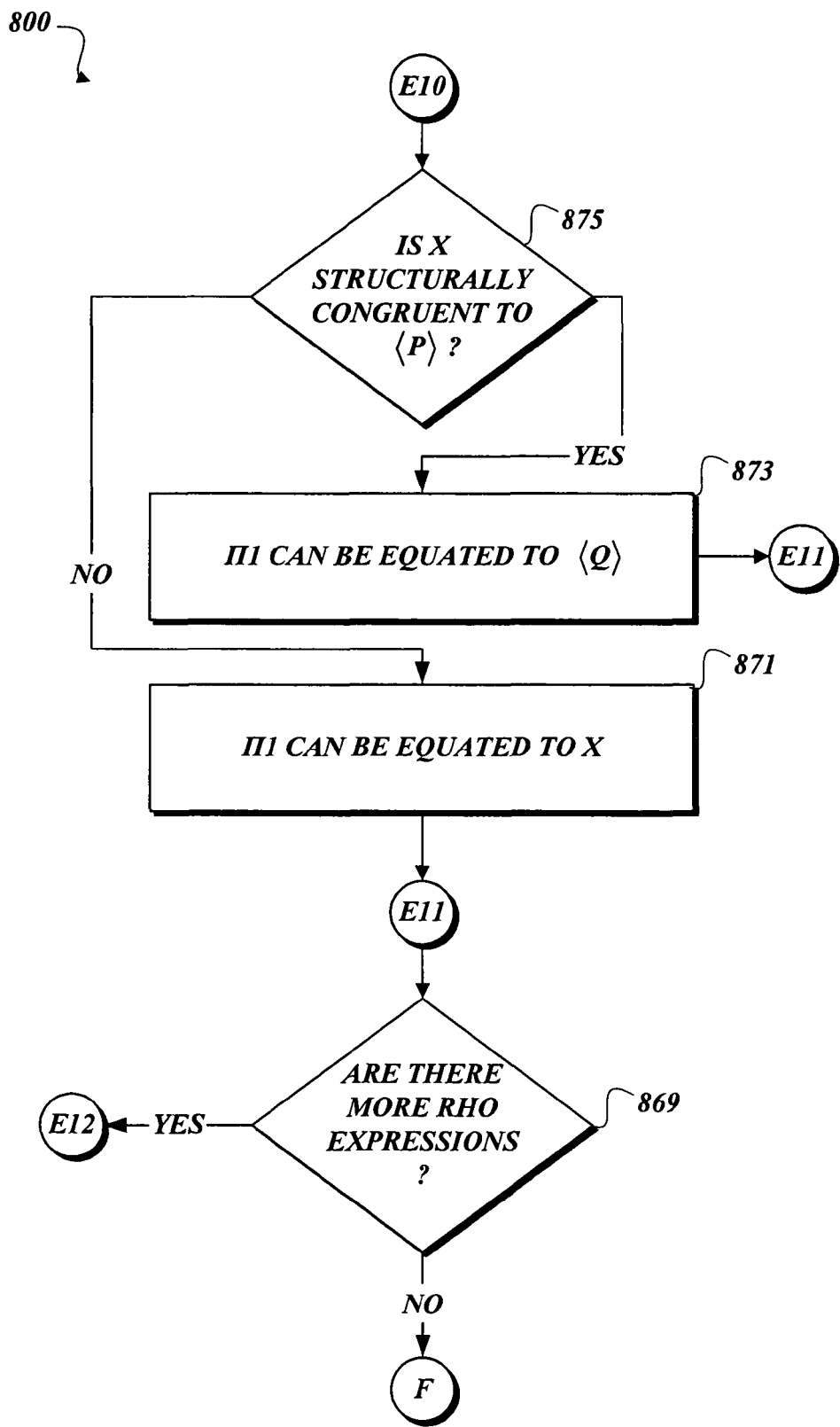

FIGS. 8A-8R illustrate a method 800 for compiling or executing a ρ-calculus program, such as the replication service 600 or the name service 700. In the analysis of a ρ-calculus program, the method 800 executes sets of syntactical rules governing the structure and content of ρ expressions. Sets of equational laws governing the structural congruence of ρ expressions are also executed by the method 800. ρ-calculus language, such as languages 300-500, also includes sets of operational semantic rules governing the meanings of ρ expressions that are correctly formed in accordance with the sets of syntactical rules of the ρ-calculus language 300-500. For clarity purposes, the following description of the method 800 makes references to various elements illustrated in connection with ρ-calculus languages 300-500 shown in FIGS. 3A-5A.

Digressing, the method 800 forms a part of a compiler that preferably can be used to synchronize components of a ρ-based microprocessor 200 or an array of ρ-based microprocessors. This synchronization is explicitly controlled by the compiler instead of relying on the implicit control offered by a microprocessor. Modern CISC-based microprocessors relies on circuitry that provides guesses about the next instruction that is likely to be executed so as to speed up execution of programs. For example, a technique used in some CISC-based microprocessors with an instruction called prefetch to guess whether or not a branch will be taken in a program, and to fetch executable code from the appropriate location. When a branch instruction is executed, it and the next instruction executed are stored in a buffer. This information is used to predict which way the instruction will branch the next time it is executed. This works fine if the prediction is correct. When the prediction is incorrect, executing a branch causes missed cache hits or pipeline breakage, so the system is drastically slowed down by the need to retrieve the next instruction. This problem is compounded when the execution program is not sequential but is asynchronous and requires parallelism.

The compiler of various embodiments of the present invention lessens the need to predict from the CISC-based microprocessors. The compiler of various embodiments of the present invention allows the creation of an explicit synchronization model on one or more microprocessors on a single integrated circuit or multiple integrated circuits. The compiler of various embodiments of the present invention compiles programs written in a mathematical language, such as ρ-calculus languages 300-500, which are distinguishable over assembly languages. Assembly languages use abbreviations or mnemonic codes in which each statement corresponds to a single machine instruction. The ρ-calculus languages 300-500 provide a level of abstraction above the underlying machine language, evolved from assembly languages. Statements of ρ-calculus languages 300-500 define a set of syntactic and semantic rules that define the structure of the language. Permutational nuances of the cooperation of processes and names and the evolution of processes can be expressed using the ρ-calculus languages 300-500. These expressive nuances are suitably preserved by the mathematics of the ρ-calculus languages 300-500 so that the intentions of programmers are eventually carried out without weakening during the process of compilation to low-level languages, such as assembly languages or machine languages. In traditional programming languages, the recovery of a programmer's intent becomes deliquesced as a program is compiled from a high-level language to a low-level language. High-level languages typically are more expressive than low-level languages because high-level languages contain more information, which is undesirably removed during the process of compilation or linkage.

Returning to FIG. 8A, from a start block, the method 800 proceeds to a set of method steps 802 defined between a continuation terminal ("terminal A") and an exit terminal ("terminal B"). The set of method steps 802 runs a ρ-calculus program against the syntactical rules governing the structure and content of ρ statements. From terminal A (FIG. 8B), the method 800 proceeds to block 808 where the method 800 extracts a ρ expression (II) from the ρ-calculus program or service. Next, at decision block 810, a test is made to determine whether the ρ expression is of the form "0". If the answer to the test at decision block 810 is YES, the method 800 proceeds to block 812 where the ρ expression is a ρ process, which represents an inactive or a stop action. The method then continues to another continuation terminal ("terminal A4"). If the answer to the test at decision block 810 is NO, the method 800 proceeds to another decision block 814 where another test is made to determine whether the ρ expression is of the form X[Y]. If the answer to the test at decision block 814 is YES, the ρ expression is a ρ process, which represents an output action in which the name Y is made available at the name X. The method 800 then proceeds to terminal A4. If the answer to the test at decision block 814 is NO, the method 800 continues to another continuation terminal ("terminal A1").

From terminal A1 (FIG. 8C), the method 800 proceeds to decision block 818 where a test is made to determine whether the ρ expression is of the form X(Z).P. If the answer to the test at decision block 818 is YES, the ρ expression is a ρ process, which represents an input action followed by a process P. In other words, any name can be received by the name X after which the received name is substituted for the name Z and the process continues with the process P. The method 800 proceeds to terminal A4. If the answer to the test at decision block 818 is NO, the method 800 enters decision block 822 where another test is performed to determine whether the ρ expression is of the form LIFT X.P. If the answer to the test at decision block 822 is YES, the ρ expression is a ρ process, which represents a lift action. See block 824. The method 800 then continues to terminal A4. If the answer to the test at decision block 822 is NO, the method 800 proceeds to another continuation terminal ("terminal A2").

From terminal A2 (FIG. 8D), the method 800 proceeds to decision block 826 where a test is made to determine whether the ρ expression is of the form P|P. If the answer to the test at decision block 826 is YES, the ρ expression is a ρ process, which represents a process running in parallel with another process as a composition. See block 828. The method 800 then proceeds to terminal A4. If the answer to the test at decision block 826 is NO, the method 800 proceeds to another decision block 830 where a test is made to determine whether the ρ expression is of the form >X<. If the answer to the test at decision block 830 is YES, the ρ expression is a ρ process, which represents a deliteralization of the name X. The method 800 then proceeds to terminal A4. If the answer to the test at decision block 830 is NO, the method 800 then continues to another continuation terminal ("terminal A3").

From terminal A3 (FIG. 8E), the method 800 proceeds to a decision block 834 where a test is made to determine whether the ρ expression is of the form <P>,#(P)≦K. If the answer to the test at decision block 834 is YES, the ρ expression is a literalization of a ρ process P which expresses a name, such as the name X. The syntactical phrase "#(P)≦K" denotes that a constraint is placed on the literalization of a ρ process in the production of a name. One suitable constraint includes checking the size of the syntax tree of the ρ process P against a certain threshold beyond which no production of a name from the literalization of the process P is possible. Other constrains are possible as long as the constraint models at least a portion of the finite resources coupled to a microprocessor executing a ρ process. The method 800 then continues to terminal A4. If the answer to the test at decision block 834 is NO, the method 800 continues to another decision block 838 where a test is made to determine whether the ρ expression is of the form <P>,P:T. If the answer to the test at decision block 838 is YES, the ρ expression is a literalization of a ρ process P that is constrained by a type T. See block 840. Causing a ρ process to be a member of a certain type facilitates control over the type of processes that can be literalized to form names, and therefore control the communication capability of a process. The method 800 then continues to terminal A4. If the answer to the test at decision block 838 is NO, the method 800 also proceeds to terminal A4 (FIG. 8E). A test is made at decision block 842 to determine whether there are more ρ expressions to be evaluated. If the answer is NO, the method 800 continues to the exit terminal B. Otherwise, the answer is YES to the test at decision block 842, and the method 800 proceeds to another continuation terminal ("terminal A5"). From terminal A5 (FIG. 8B), the method 800 loops back to block 808 where the above-discussed processing steps are repeated.

From the exit terminal B, the method 800 continues to a set of method steps 804, defined between a continuation terminal ("terminal C") and an exit terminal ("terminal D"). The set of method steps 804 uses a set of equational laws to check the ρ expressions for structural congruence. From terminal C (FIG. 8F), the method 800 proceeds to block 844 where the method 800 extracts a ρ expression. A test is made at decision block 846 to determine whether the ρ expression is of the form <>X<>. If the answer to the test at decision block 846 is YES, the method 800 infers that the ρ expression is structurally congruent to the name X. See block 848. The method 800 then continues to another continuation terminal ("terminal C3"). Otherwise, the answer to the test at decision block 846 is NO, and the method 800 proceeds to decision block 850 where another test is made to determine whether the ρ expression is of the form P|0. If the answer to the test at decision block 850 is YES, the method 800 infers that the ρ expression is structurally congruent to the process P. The method 800 then enters terminal C3. Otherwise, the answer to the test at decision block 850 is NO, and the method continues to another continuation terminal ("terminal C1").

From terminal C1 (FIG. 8G), the method 800 proceeds to decision block 854 where a test is made to determine whether the ρ expression is of the form 0yt|P. If the answer is YES to the test at decision block 854, the method 800 infers that the ρ expression is structurally congruent to the process P. See block 856. The method 800 enters terminal C3. If the answer to the test at decision block 854 is NO, the method 800 continues to execute another test at decision block 858 to determine whether the ρ expression is of the form $P_0|P_1$. If the answer to the test at decision block 858 is YES, the method 800 infers that the ρ expression is structurally congruent to the composition of processes $P_1|P_0$. See block 860. The method 800 continues to terminal C3. If the answer is NO to the test at decision block 858, the method 800 continues to another continuation terminal ("terminal C2").

From terminal C2 (FIG. 8H), the method 800 continues to decision block 862 where a test is made to determine whether the ρ expression is of the form $(P_0|P_1)|P_2$. If the answer to the test at decision block 862 is YES, the ρ expression is structurally congruent to a composition of processes $P_0|(P_1|P_2)$. The method 800 continues to terminal C3. If the answer to the test at decision block 862 is NO, the method 800 also continues to terminal C3. From terminal C3 (FIG. 8I), the method 800 performs a test at decision block 866 to determine whether there are more ρ expressions to be evaluated. If the answer is NO, the method 800 continues to the exit terminal D. Otherwise, the answer to the test at decision block 866 is YES, and the method continues to another continuation terminal ("terminal C4"). From terminal C4 (FIG. 8F), the method 800 loops back to block 844 where the above-discussed processing steps are repeated.

From the exit terminal D (FIG. 8A), the method 800 proceeds to a set of method steps 806, defined between a continuation terminal ("terminal E") and an exit terminal ("terminal F"). The set of method steps 806 runs the ρ-calculus program against a set of operational semantic rules to check the meanings of ρ process expressions. From terminal E (FIG. 8J), the method 800 proceeds to block 868 where the method 800 extracts a ρ expression for evaluation. The method 800 proceeds to decision block 870 where a test is made to determine whether the ρ expression is of the form LIFT X.P. If the answer to the test at decision block 870 is YES, the ρ expression is reduced to X[<P>]. The method then continues to another continuation terminal ("terminal E11"). If the answer is NO to the test at decision block 870, the method 800 performs another test at decision block 874 where it is determined whether the ρ expression is of the form $P_0|P_2$. If the answer is YES to the test at decision block 874, the method continues to another continuation terminal ("terminal E1"). Otherwise, the answer to the test at decision block 874 is NO, and the method 800 enters another continuation terminal ("terminal E2").

From terminal E1 (FIG. 8K), the method 800 proceeds to decision block 876 where a test is made to determine whether the term $P_0$ can be reducible to the term $P_1$. If the answer is YES, the ρ expression is reduced to $P_1|P_2$. The method 800 then continues to terminal E11. Otherwise, the answer to the test at decision block 876 is NO, and the method 800 continues to terminal E2. From terminal E2 (FIG. 8K), a test is performed to determine whether the ρ expression is of the form $P_2$. See decision block 880. If the answer is YES to the test at decision block 880, another test is performed to determine whether the term $P_2$ is structurally congruent to the term $P_0$. See decision block 882. If the answer to the test at decision block 882 is YES, the method 800 proceeds to another continuation terminal ("terminal E3"). If the answer to either the test at decision block 880 or decision block 882 is NO, the method 800 enters another continuation terminal ("terminal E4").

From terminal E3 (FIG. 8L), the method 800 proceeds to decision block 884 where a test is made to determine whether the term $P_0$ can be reducible to the term $P_1$. If the answer to the test at decision block 884 is YES, another test is made at decision block 886 to determine whether the term $P_1$ is structurally congruent to the term P. If the answer to the test at decision block 886 is YES, the method 800 reduces the term $P_2$ to the term $P_3$. See block 888. The method 800 proceeds to terminal E11. If the answer to either the test at decision block 884 or decision block 886 is NO, the method 800 continues to terminal E4.

From terminal E4 (FIG. 8L), the method 800 performs a test to determine whether the ρ expression is of the form $X_0[X_2]|X_0(X_1).P_0$. See decision block 890. If the answer to the test at decision block 890 is YES, the method 800 proceeds to another continuation terminal ("terminal E5"). Otherwise, the answer to the test at decision block 890 is NO, and the method then enters another continuation terminal ("terminal E9").

From terminal E5 (FIG. 8M), the ρ expression is reduced to a second ρ expression (II1), which is $P_0\{X_2/X_1\}$. See block 892. A test is performed at decision block 894 to determine whether the second ρ expression is of the form (0)>{<Q>/<P>}<. If the answer to the test at decision block 894 is YES, the second ρ expression can be equated to the process 0. See block 896. The method 800 then proceeds to terminal E11. Otherwise, the answer to the test at decision block 894 is NO, and the method 800 proceeds to another decision block 898 where another test is performed to determine whether the second ρ expression is of the form (R|S)>{<Q>/<P>}<. If the answer to decision block 898 is YES, the second ρ expression can be equated to (R)>{<Q>/<P>}<|(S)>{<Q>/<P>}<. See block 899. The method 800 continues to terminal E11. If the answer to the test at decision block 898 is NO, the method 800 continues to another continuation terminal ("terminal E6").

From terminal E6 (FIG. 8N), the method 800 performs a test at decision block 897 to determine whether the second ρ expression is of the form (X(Y).R)>{<Q>/<P>}<. If the answer to the test at decision block 897 is YES, the second ρ expression can be equated to (X){<Q>/<P>}(Y).((R)>{<Q>/<P>}<). See block 895. The method 800 proceeds to terminal E11. If the answer to the test at decision block 897 is NO, the method 800 enters decision block 893 where another test is performed to determine whether the second ρ expression is of the form (X[Y])>{<Q>/<P>}<. If the answer to the test at decision block 893 is YES, the second ρ expression can be equated to (X){<Q>/<P>}[(Y){<Q>/<P>}]. See block 891. The method 800 enters terminal E11. If the answer is NO to decision block 893, the method 800 proceeds to another continuation terminal ("terminal E7").

From terminal E7 (FIG. 8O), the method continues to decision block 889 where a test is performed to determine whether the second ρ expression is of the form (LIFT X.R)>{<Q>/<R>}<. If the answer to the test at decision block 889 is YES, the second ρ expression can be equated to LIFT(X){<Q>/<P>}.(R)>{<Q>/<P>}<. See block 887. The method 800 enters terminal E11. If the answer is NO to the test at decision block 889, the method 800 performs another test at decision block 885 to determine whether the second ρ expression is of the form (>X<)>{<Q>/<P>}<. If the answer to the test at decision block 885 is YES, the method 800 enters another continuation terminal ("terminal E8"). Otherwise, the answer to the test at decision block 885 is NO, and the method 800 proceeds to terminal E9.

From terminal E8 (FIG. 8P), the method 800 proceeds to decision block 883 where a test is made to determine whether the name X is structurally congruent to <P>, which represents the literalization of the process P. If the answer is YES, the second ρ expression can be equated to the process Q. See block 881. The method 800 enters terminal E11. If the answer is NO to the test at decision block 883, the method 800 proceeds to block 879 where the second ρ expression can be equated to >X<, which represents the deliteralization of the name X. The process continues to terminal E11.

From terminal E9 (FIG. 8Q), the method 800 proceeds to decision block 877 where a test is made to determine whether the second ρ expression is of the form (X){<Q>/<P>}. If the answer is YES, the method 800 proceeds to another continuation terminal ("terminal E10"). Otherwise the answer to the test at decision block 877 is NO, and the method proceeds to terminal E11.

From terminal E10 (FIG. 8R), the method 800 proceeds to decision block 875 where a test is made to determine whether the name X is structurally congruent to <P>, which denotes the literalization of the process P. If the answer is YES to decision block 875, the second ρ expression can be equated to <Q>, which represents the literalization of the process Q. See block 873. The method 800 continues to terminal E11. If the answer is NO to decision block 875, the method 800 equates the second ρ expression to the name X. See block 871. From block 871, the method 800 continues to terminal E11 and performs a test at decision block 869 to determine whether there are more ρ expressions to be evaluated. If the answer is NO, the method 800 continues to exit terminal F where the method 800 finishes and terminates execution. Otherwise, the answer to the test at decision block 869 is YES, and the method 800 proceeds to another continuation terminal ("terminal E12"). From terminal E12, the method 800 loops back to block 868 where the above-described processing steps are repeated.

While the preferred embodiment of the invention has been illustrated and described, it will be appreciated that various changes can be made therein without departing from the spirit and scope of the invention.

The embodiments of the invention in which an exclusive property or priviledge is claimed are defined as follows:

1. A microprocessor for executing instructions, comprising:
  a timing and control unit configured to:
    retrieve an instruction to compose a plurality of processes running in parallel from a memory, the instruction being expressed in a reflective process algebra, the reflective process algebra being arranged to represent a name as a literalization of a process and a process as a deliteralization of a name,
    decode the instruction,
    fetch data connected with the instruction, the data comprising at least a first name that is a literalization of a first process and a second name that is a literalization of a second process, the first name and the second name being obtained using the reflective process algebra, communicate at least the first name and the second name for composing the plurality of processes running in parallel;

receive a result of the composing, the result comprising another name representing a composition of the plurality of processes;

literalize the result of the composing; and save the result of the composing; and an arithmetic and logic unit configured to:

receive at least the first name and the second name, perform the composing of the plurality of processes running in parallel, the composing including mathematically deliteralizing the first name to the first process and the second name to the second process, and initiate execution of the first and second processes concurrently;

wherein a synchronization of the microprocessor includes a compiler-created explicit synchronization model based on the reflective process algebra.

2. The microprocessor of claim 1, further comprising a register array for storing the result of the executed instruction.

3. The microprocessor of claim 2, further comprising an instruction register and decoder for holding the instruction of the microprocessor is executing.

4. The microprocessor of claim 3, further comprising bus connections for allowing the microprocessor to receive data into memory internally and for communicating result of the executed instruction externally.

5. The microprocessor of claim 4, wherein the timing and control unit, the arithmetic and logic unit, and the instruction register and decoder communicates via ports that have unilateral contracts associated with ports.

6. An array of microprocessors for executing instructions, comprising:

at least one microprocessor that includes one or more components that are synchronized based on a program compiler configured to compile a program written in a reflective process algebra, the reflective process algebra being arranged to represent a name as a literalization of a process and a process as a deliteralization of a name, the microprocessor including:

a timing and control unit for:

retrieving an instruction from a memory, decoding the instruction, fetching data connected with the instruction, literalizing a result of a composing of a plurality of processes in parallel, including saving the result of the composing, the data including names obtained by literalizing processes in the reflective process algebra; and an arithmetic and logic unit configured to:

perform the composing of the plurality of processes running in parallel, the composing including receiving the names, mathematically deliteralizing the names into respective processes, and initiating concurrent execution of the respective processes represented by the names obtained by the literalizing process;

wherein a synchronization of the array of microprocessors includes a compiler-created explicit synchronization model based on the reflective process algebra.

7. The array of microprocessors of claim 6, wherein the array of microprocessors are on a single integrated circuit.

8. The array of microprocessors of claim 6, wherein the array of microprocessors are on multiple integrated circuits, the multiple integrated circuits being mounted on a single board.

9. The array of microprocessors of claim 6, wherein the array of microprocessors are on multiple integrated circuits, the multiple integrated circuits being mounted on multiple boards, the multiple boards being housed on a single rack of a computer.

10. The array of microprocessors of claim 6, wherein the array of microprocessors are on multiple integrated circuits, the multiple integrated circuits being mounted on multiple boards, the multiple boards being housed on multiple racks of multiple computers.

11. The array of microprocessors of claim 6, further comprising a network for coupling one or more microprocessors, the network being selected from a group consisting of permanent connections and temporary connections.

12. The array of microprocessors of claim 6, wherein the components of the at least one microprocessor are synchronized by instructions produced by a compiler that compiles a program written in the reflective process algebra.

13. The array of microprocessors of claim 6, wherein the array of microprocessors are synchronized by instructions produced by a compiler that compiles a program written in the reflective process algebra.

14. The array of microprocessors of claim 6, wherein the components of the at least one microprocessor lacks circuitry for predicting a next instruction to be executed.

* * * * *